United States Patent
Kurozasa

(12) 
(10) Patent No.: US 6,278,526 B1
(45) Date of Patent: *Aug. 21, 2001

(54) IMAGE PROCESSING SYSTEM FOR ENABLING SETTING OF OPERATION MODE FROM EXTERNAL COMPUTER

(75) Inventor: Yoshiharu Kurozasa, Yokohama (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,406

(22) Filed: Oct. 23, 1997

(30) Foreign Application Priority Data

Oct. 25, 1996 (JP) .................................................. 8-284005

(51) Int. Cl.[7] ...................................................... G06F 15/00
(52) U.S. Cl. ........................ 358/1.15; 358/1.13; 358/296; 358/442; 358/468
(58) Field of Search ................................... 358/442, 468, 358/452, 453, 296, 440, 1.15, 1.9, 400, 401, 448, 1.13, 1.14

(56) References Cited

U.S. PATENT DOCUMENTS

| | | | |
|---|---|---|---|
| 5,459,579 | * 10/1995 | Hu et al. ............................... | 358/296 |
| 5,467,202 | * 11/1995 | Washio et al. ........................ | 358/448 |
| 5,684,607 | * 11/1997 | Matsumoto ........................... | 358/442 |
| 5,717,501 | * 2/1998 | Iwamoto et al. ...................... | 358/468 |
| 5,815,280 | * 9/1998 | Ohmura et al. ....................... | 358/296 |
| 5,847,843 | * 12/1998 | Shibata et al. ....................... | 358/440 |
| 5,914,789 | * 6/1999 | Murata ................................. | 358/442 |
| 5,917,616 | * 6/1999 | Chou et al. ........................... | 358/488 |
| 5,920,405 | * 7/1999 | McIntyre et al. ..................... | 358/442 |
| 5,999,708 | * 12/1999 | Kajita ................................... | 395/114 |

* cited by examiner

*Primary Examiner*—Edward Coles
*Assistant Examiner*—Mark Wallerson
(74) *Attorney, Agent, or Firm*—Sidley & Austin

(57) ABSTRACT

An external computer is connected to a main control unit of a copying machine via a control unit. The external computer starts a mode setting application and transmits various commands to the control unit. A ROM of the control unit stores a translation program and programs for data processing which cannot be performed by the copying machine. A CPU of the control unit reads necessary programs from the ROM, translates commands sent from the external computer, and transmits the translated commands to the main control unit to perform a designated copy mode. The control unit itself performs data processing which cannot be performed by the main control unit so that various copy modes are available.

19 Claims, 15 Drawing Sheets

IMAGE PROCESSING SYSTEM FOR ENABLING SETTING OF OPERATION MODE FROM EXTERNAL COMPUTER

BACKGROUND OF INVENTION (1) Field of the Invention

The present invention relates to an image processing system which reproduces inputted image data according to a selected operation mode.

(2) Related Art

A digital copying machine, which reproduces an image based on image data obtained by reading an original document using a scanner unit, subjects the image data to the necessary correction processing, processes the image data according to a designated copy mode, and reproduces the image on a copy sheet with a printer unit based on the processed image data.

After an operator designates a desired copy mode using hard keys or a touch panel which are provided on an operation panel, a control unit in the copier has the image data subjected to processing corresponding to the designated copy mode and has the processed image data printed out, thereby executing the desired copy mode.

However, in recent years, various kinds of image processing have become possible because of the digitalization of copiers, so that a variety of copy mode settings are now possible. To achieve such various copy modes, it is necessary to increase the capacity of a memory which stores programs for performing copy modes. However, it is comparatively high in cost to install a high-capacity memory into a general-purpose digital copier.

Even if the capacity of a memory were increased to enable data processing corresponding with various copy modes, there are cases where it is still difficult to provide all input means for designating the various copy modes on an operation panel, since the operation panel is provided within the limited available space at the front of the copier.

SUMMARY OF THE INVENTION

Regarding the problems as described above, the object of the present invention is to provide an image processing system in which various copy modes can be set by an external control apparatus which is separate from the copier.

The above object can be achieved by an image processing system including an image forming apparatus and an external computer which are connected to each other. The image forming apparatus includes a control unit for controlling an image forming operation according to an image forming operation mode which is selected from a plurality of image forming operation modes, and a first operation mode selecting unit for selecting an image forming operation mode from predetermined image forming operation modes in the plurality of image forming operation modes. The external computer includes a second operation mode selecting unit for selecting an image forming operation mode from image forming operation modes including image forming operation modes that are not included in the predetermined image forming operation modes. As mentioned above, the external computer includes the second operation mode selecting unit for setting operation modes which cannot be set by the first mode selecting unit of the image forming apparatus, which enables selecting of additional print operation modes.

The above object can also be achieved by an image processing system including an image forming apparatus, an external computer, and an external image editing apparatus. The image forming apparatus includes a first control unit for controlling an image forming operation according to an image forming operation mode which is selected from a first group of image forming operation modes. The external image editing apparatus includes a second control unit for controlling an image forming operation of the image forming apparatus according to an image forming operation mode which is selected from a second group of image forming operation modes. The external computer includes an operation mode recognizing unit for recognizing image forming operation modes included in the first group and image forming operation modes included in the second group, an operation mode selecting unit for selecting an image forming operation mode from the image forming operation modes in the first group and the second group recognized by the operation mode recognizing unit, and a determination unit for determining which of the first control unit and the second control unit is to perform the operation mode selected by the operation mode selecting unit.

The image processing system in the present invention having such a structure as mentioned above enables not only the first control unit of the image forming apparatus but the second control unit of the external image editing apparatus to perform operation modes. The external computer recognizes the operation modes of the image forming apparatus and the external image editing apparatus by its operation mode recognizing unit and determines which of the image forming apparatus and the external image editing apparatus should perform a mode selected by the operation mode selecting unit, which enables performing a desired operation mode. This increases the number of operation modes that can be set since additional operation modes are performed by the external image editing apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following is an explanation of an embodiment of the image processing system in accordance with the present invention, with reference to the drawings.

Figure 1:
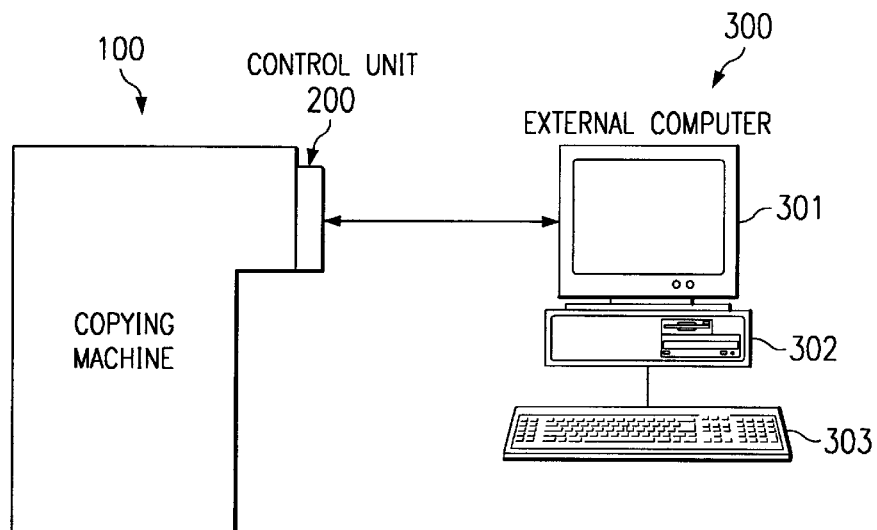
FIG. 1 shows an overall structure of the image processing system of an embodiment of the present invention.

FIG. 1 shows the overall structure of the image forming system of this embodiment of the present invention.

As shown in FIG. 1, this image forming system includes a digital copier 100 (hereinafter called "copier 100"), a control unit 200 which is connected to a controller 400 (see FIG. 4) in the copier 100 via connecters, and an external computer 300 which is connected to the controller 400 via the control unit 200.

The following is an explanation of this image forming system in terms of, (1) the structure of the copier 100, (2) the structure of the controller 400, (3) the structure of the control unit 200, (4) a mode setting operation from the external computer, and (5) embodiment modifications.

(1) Structure of the Copier 100

Figure 2:
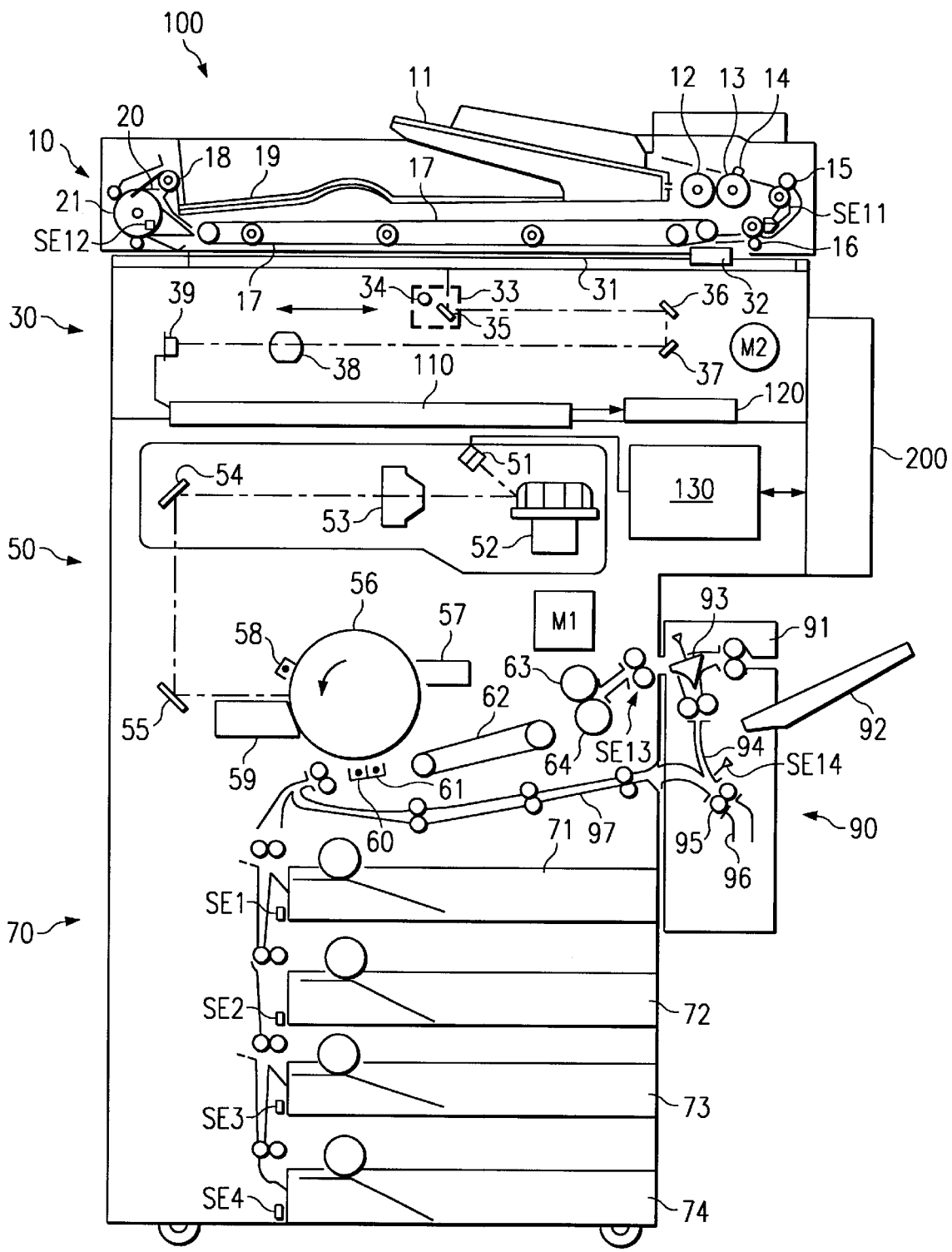
FIG. 2 shows the structure of the copier of the image processing system.

FIG. 2 shows the structure of the copier 100 of the present embodiment. As shown in the figure, the copier 100 can be roughly divided into an automatic document transport unit 10, an image reader unit 30, a printer unit 50, a sheet feeding unit 70, and a re-feeding unit 90.

Documents placed on a document feeding tray 11 of the automatic document transport unit 10 are picked up one by one and transported downward by a feeding roller 12, a separator roller 13, and a separator pad 14. The picked-up document is further transported onto a document glass plate 31 by a transport roller 15, a resister roller 16, and a transport belt 17 until the bottom end of the document reaches a standard document reading position determined by a document scale 32.

After the document is scanned by a scanner 33 of the image reader unit 30, the transport belt 17 is driven again and the document is discharged onto a document discharge tray 19 by a discharge roller 18.

When the other side of the document is also scanned, the document transport path is switched toward a reverse roller 21 by a switching claw 20 so that the document can be sent back onto the document glass plate 31 having been turned over by the reverse roller 21. The transport belt 17 further transports the document to the standard document reading position on the document glass plate 31.

After the other side of the original document has been scanned, the transport belt 17 is driven clockwise and the document is discharged onto the document discharge tray 19 as described above, with the next document on the document feeding tray 11 being transported to the standard document reading position.

The automatic document transport unit 10 is hinged to the rear of the copier (when looking in the same direction as the view in FIG. 2) and so may be lifted to allow a document to be placed on the document glass plate 31 manually.

The image reader unit 30 includes a scanner 33 that is moved in the direction shown by the arrow under the document glass plate 31 by a scanner motor M2 to scan the document placed on the document glass plate 31. The scanner 33 includes an exposure lamp 34 and a mirror 35 for reflecting the light from the exposure lamp 34 that has been reflected back from the document. The reflected light from the document is reflected in a direction parallel to the document glass plate 31. The reflected light is further led to a CCD image sensor 39 (hereinafter called "CCD sensor") via mirrors 36 and 37, and a converging lens 38.

The original image is subjected to photoelectric conversion by the CCD sensor 39 to be converted to image data. The image data is subjected to A/D conversion by an image signal processing unit 110 to be digitalized and is further subjected to processing such as shading correction, density conversion, and edge emphasis. The image data is then stored in a memory unit 120.

The image data stored in the memory unit 120 is read by a print processing unit 130 and is subjected to processing such as $\gamma$ correction to become a control signal used for controlling an output of a laser diode 51 of the printer unit 50.

Laser light emitted from the laser diode 51 is reflected by mirrors on sides of a polygon mirror 52, which rotates at a constant angular velocity, and exposes the surface of a photosensitive drum 56 via a f$\Theta$ lens 53, and mirrors 54 and 55.

Before being exposed as described above, the surface of the photosensitive drum 56 is cleared of the residual toner by a cleaning unit 57, neutralized by an eraser lamp (not shown in the figure), and uniformly sensitized by a sensitizing charger 58. An electrostatic latent image is formed on the surface of the photosensitive drum 56 after the uniformly-sensitized surface of the drum is subjected to the exposure as described above.

A developing unit 59 develops the electrostatic latent image on the photosensitive drum 56 by supplying black toner.

A sheet feeding unit 70 includes four sheet cassettes 71 to 74. The size of copy sheets such as transferring papers and OHP films contained in these cassettes is detected by photoelectric sheet size sensors SE1 through SE4, and the detection signals are transmitted to a printer control unit 430 (shown in FIG. 4) which will be described later.

In synchronization with image forming operations of the photosensitive drum 56, copy sheets of a desired size are fed from one of the sheet cassettes 71 to 74, and contact with the bottom side of the surface of the photosensitive drum 56. The toner adhering to the surface of the photosensitive drum 56 is transferred onto the surface of a copy sheet by means of the electrostatic power of a transfer charger 60.

The copy sheet is separated from the surface of the photosensitive drum 56 by a separation charger 61 and is transported to a fixing unit 63.

The toner image transferred onto the copy sheet is in such a unstable state that the image will be come off when touched slightly. Accordingly, a fixed roller 64 that includes a heater is used to heat and roll the toner image in the fixing unit 63, thereby fixing it to the copy sheet. The copy sheet with the fixed image is then discharged onto a sheet receiving tray 92 via a transport path 91 in a re-feeding unit 90.

If the other side of the copy sheet is printed (two-sided copy mode), the direction of the switching claw 93 of the re-feeding unit 90 is changed to lead the copy sheet into the transport path 94. Further, the copy sheet is sent toward a switchback transport path 96 by switchback rollers 95, and transported back to the transfer position on bottom side of the photosensitive drum 56 via a transport path 97. By doing so, an image is formed on the other side of the copy sheet.

Each of the sensors SE11 to SE14 provided at certain positions is a jam detecting sensor achieved by a reflex type photoelectric sensor having a light emitting element and an photoelectric conversion element. Each sensor detects the edges of the transported copy sheet, and when a sensor does not detect the bottom edge of a copy sheet within a predetermined period of time since the detection of the top edge of the copy sheet, the printer control unit 430 (shown in FIG. 4) judges that a jam has occurred.

Figure 3:
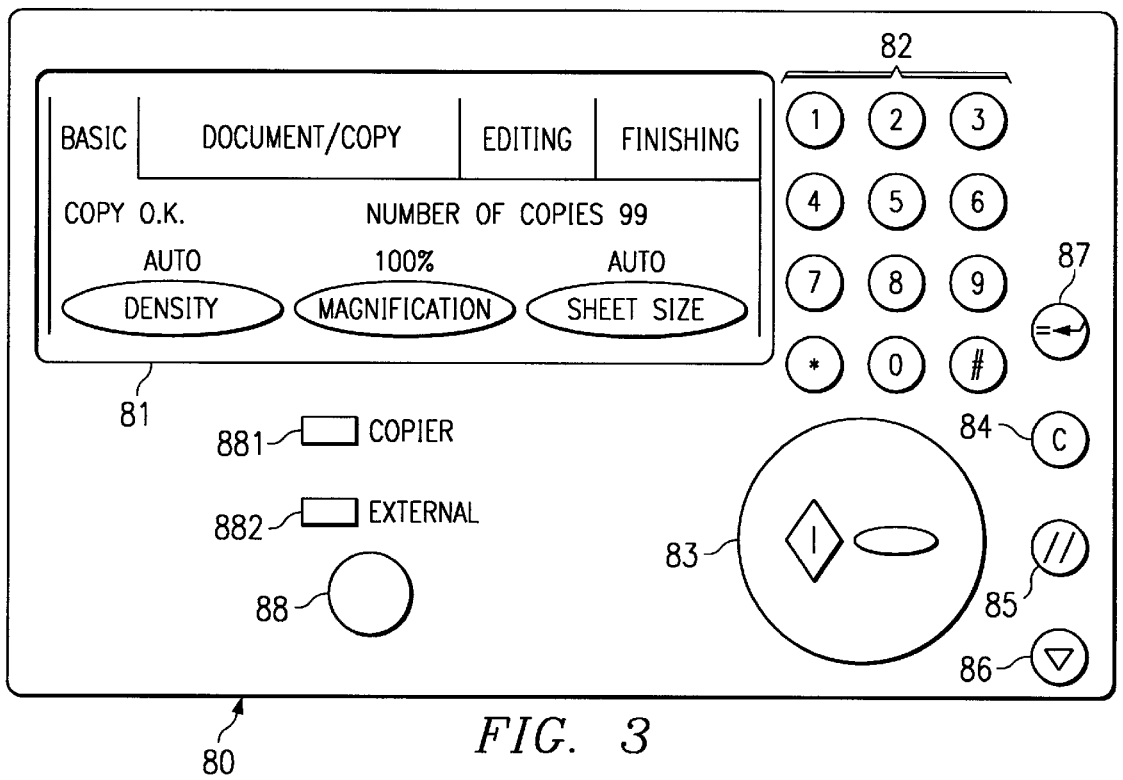
FIG. 3 shows an example of the operation panel structure of the copier.

An operation panel 80 shown in FIG. 3 is provided at the front of the image reader unit 30 to allow easy operation, and receives operations by the operator.

The operation panel 80 has a liquid crystal touch panel 81 for displaying various modes, a 10-key pad 82 for inputting information such as the number of copies to be made and the magnification ratio, a start key 83 for starting a copy operation, a clear key 84 for resetting the number of copies to be made to the standard value "1", a panel reset key 85 for resetting various conditions set in the copier to the standard conditions, a stop key 86 for stopping a copy operation, an interrupt key 87 for performing an interrupt copy during a copy operation, and an operation panel switching key 88 for designating which of the operation panel 80 and the external computer 300 is used to set copy modes. Either a lamp 881 or a lamp 882 is illuminated according to this designation to inform the operator whether the inputting of a copy mode is received from the operation panel 80 or the external computer.

The liquid crystal touch panel 81 is a liquid crystal display panel with a touch panel thereon. The liquid crystal display panel displays the number of copies, copy density, magnification ratio, and copy sheet size as shown in the figure. The liquid crystal display panel further displays information of various error conditions of the copier 100 such as a paper jam, "a serviceman call" (an indication that an inspection needs to be performed by a serviceman because the apparatus is out of order), and "paper empty" of the sheet cassettes. Desired information can be inputted by touching the surface of the liquid crystal touch panel at a certain position.

(2) Structure of the Control Unit

Figure 4:
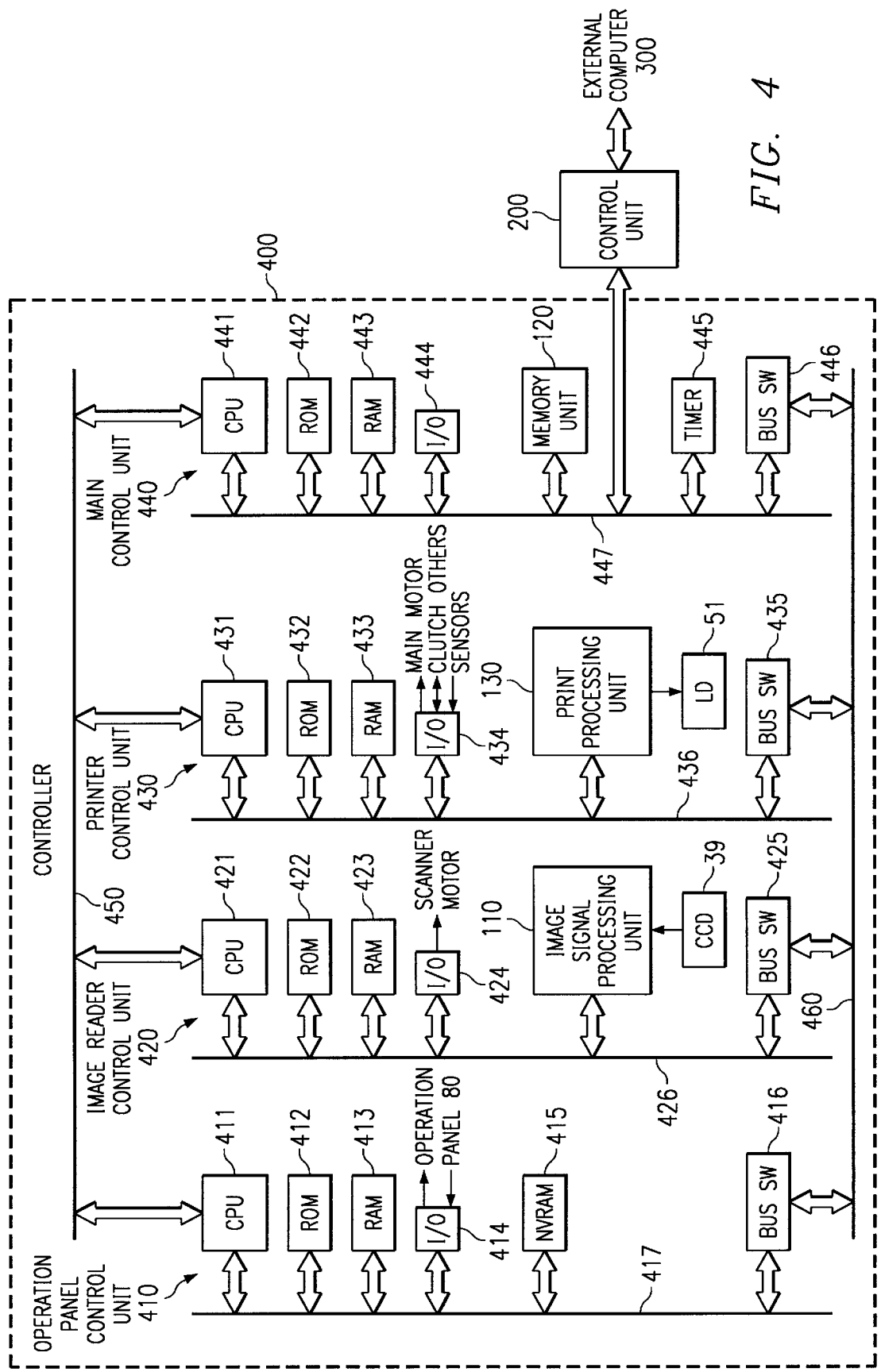
FIG. 4 shows a block diagram of a controller of the copier.

The following is an explanation of the structure of the controller 400 provided in the copier 100, with reference to a block diagram shown in FIG. 4.

The controller 400 can be roughly divided into an operation panel control unit 410, an image reader control unit 420, a printer control unit 430, and a main control unit 440 for integrating these control units and for processing data corresponding to various copying modes, where CPUs 411, 421, 431, and 441 of each control unit are connected to each other via a command line 450 to exchange necessary command information.

Data buses 417, 426, 436, and 447 in each control unit are connected to an image data line 460 via bus switches (BUS SW) 416, 425, 435, and 446 respectively and image data is transmitted by turning on each bus switch.

ROMs 412, 422, 432, and 442 in each control unit stores a basic program necessary for each control unit, with these programs being used by the CPUs 411, 421. 431, and 441 to control each unit.

RAMs 413, 423, 433, and 443 mainly store designations by an operator and operation states, and supply the respective CPUs with these designations and operation states.

Via I/O ports 414, 424, 434, and 444, control instructions are sent to an external scanner motor M2 and main motor M1 and inputs from the operation panel 80 or detection signals of various sensors are received.

The following is an explanation of each control unit of the controller 400.

(2-1) Operation Panel Control Unit

The operation panel control unit 410 controls a screen on the liquid crystal touch panel 81 in the operation panel 80 (shown in FIG. 3) and informs other control units of information inputted from the operation panel 80.

The ROM 412 stores a panel display program for changing a screen displayed on the liquid crystal touch panel 81. An NVRAM 415 stores data of an initial display mode. After the copier 100 is switched on, the data of the initial display mode is read from the NVRAM 415 to display an initial screen on the liquid touch panel 81 and to light the lamp 881 for indicating that input from the operation panel 80 is possible.

If an operator touches a "SHEET SIZE" button on the liquid crystal touch panel 81, for instance, the operation panel control unit 410 makes the liquid crystal touch panel 81 display a size list of sheets contained in the sheet cassettes 71 to 74, instead of the initial screen. If the operator selects a sheet size from the size list, the selected sheet size is reported to the printer control unit 430 via the command line 450 and is stored in the RAM 433.

The operation panel control unit is programmed to automatically reset the size list to the initial display when a predetermined time period registered in the NVRAM 415 has passed without any key input.

(2-2) Image Reader Control Unit

The image reader control unit 420 controls a document transport operation performed by the automatic document transport unit 10 and a scanning operation performed by the image reader unit 30, and also instructs an image signal processing unit 110 to process image data sent from the CCD sensor 39.

More specifically, the ROM 422 of the image reader control unit 420 stores a program for the above control. A new program or condition is written into the RAM 423 each time the operator changes the program or condition of image signal processing. The CPU 421 reads the program to transmit control signals with provided timing. For instance, if a control signal is related to the movement of the scanner 33, the CPU 421 transmits the control signal to control the driving of the scanner motor M2 via the I/O port 424.

The image signal processing unit 110 includes an A/D converter, a shading correction unit, a density change unit, a magnification change unit, and an image quality correction unit. Image data sent from the CCD sensor 39 is converted into digital multi-value data and is subjected to shading correction, where the unevenness caused by the exposure lamp 34 and the CCD sensor 39 is corrected. Image data having been subjected to the shading correction expresses the amount of light reflected back from the document, so that the image data is converted to density data as recognized by human eyes. The image data is further subjected to image quality improvement processing, such as edge sharpening processing, and is sent to the main control unit 440 via the image data line 460. The main control unit 440 stores the image data in a memory unit 120 as described later.

(2-3) Printer Control Unit

As described with reference to the structure of the copier 100, the printer control unit 430 integrally controls operations of the printer unit 50, the sheet feeding 70, the re-feeding unit 90, and the print processing unit 130 to form images on copy sheets.

The ROM 432 stores a program for controlling the printer. Based on the program, the CPU 431 reads image data from the memory unit 120, inputs the image data into the print processing unit 130, and controls output of the laser diode (LD) 51. In a print operation, the CPU 431 further controls the rotation of the main motor M1 and an ON/OFF operation of a clutch which transmits the rotation to rotation axes of rollers of the photosensitive drum 56 and transport belt 62 via the I/O port 434.

Detection signals sent from various sensors are inputted into the CPU 431 via the I/O port 434. For example, a sheet cassette selection and a sheet feeding operation is controlled based on size detection signals from the sheet size sensors SE1 to SE4. A paper jam is detected based on signals from jam detection sensors SE11 to SE14 and the operation panel control unit 410 is informed of the paper jam and a warning is displayed on the liquid crystal touch panel 81 of the operation panel 80.

Outputs from the sensitizing charger 58 and the transfer charger 60 are adjusted to optimize the printing according to detection values from a temperature sensor, a humidity sensor, and an AIDC sensor which detects the condition of the toner adhering to the surface of the photosensitive drum 56 (none of the sensors are shown in the drawings).

(2-4) Main Control Unit

The main control unit 440 issues commands to the operation panel control unit 410, the image reader control unit 420, and the printer control unit 430 to control these units uniformly, and processes image data stored in the memory unit 120 to perform a copy mode designated by an operator.

The program for controlling each unit and the image data processing program for performing various copy modes are stored in the ROM 442, from which the CPU 441 reads necessary programs to control each operation. The data of setting the state of each unit and the data of image data processing ability are stored in the RAM 443.

The timer 445 starts to measure time when the execution of the control program is begun and the CPU 441 monitors processing time based on the timer. If the processing by each unit is not completed within a predetermined time period, the CPU 441 judges that an "error" has occurred and makes the liquid crystal touch panel 81 of the operation panel 80 display a warning to the operator.

Figure 5:
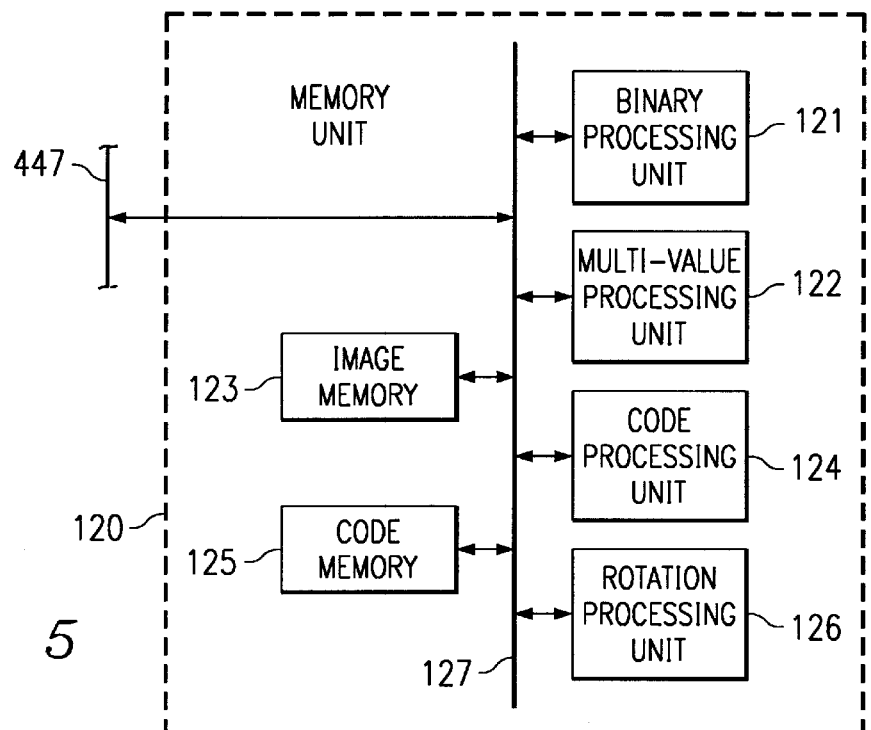
FIG. 5 is a block diagram of a memory unit of the controller of FIG. 4.

As shown in the block diagram in FIG. 5, the memory unit 120 includes a binary processing unit 121, a multi-value processing unit 122, an image memory 123, a code processing unit 124, a code memory 125, and a rotation processing unit 126, where these units are connected to each other via a data bus 127. The data bus 127 is connected to a data bus 447 so that image data is transmitted and received between them and the memory unit 120 can be controlled by the CPU 441 via the data bus 447.

The binary processing unit 121 converts inputted multi-value image data into binary data based on a parameter given by the CPU 441. The multi-value processing unit 122 converts inputted binary image data into multi-value data based on a parameter given by the CPU 441.

The image memory 123 is a multi-port memory having a capacity to store image data of two pages in A4 at an image resolution of 400 dpi.

The code processing unit 124 can independently perform compression and decompression of image data based on a designation from the CPU 441 The code memory 125 has a multi port and stores coded and compressed image data. As described above, both of the image memory 123 and the code memory 125 have multi ports and the code processing unit 124 can compress and decompress data at the same time. Therefore, it is possible for image data to be read from the image memory 123, compressed, and stored in the code memory 125, while code data is read from the code memory 125, decompressed, and stored in the image memory 123, thereby reducing data processing time.

The rotation processing unit 126 rotates a display position of an image by a predetermined angle based on the designation from an operator. For example, an image of an original document may be rotated by 90 degrees and reproduced on a copy sheet.

The memory unit 120 having the above structure writes and reads image data according to control by the CPU 441. More specifically, image data that has been corrected as necessary in the image signal processing unit 110 is transmitted to the memory unit 120 via the data bus 447. The image data is then converted into binary data by the binary processing unit 121, and temporarily stored in the image memory 123. The code processing unit 124 reads the image data from the image memory 123, encodes the image data, and writes the encoded data into the code memory 125. When image data is read, the above procedure is reversed. The encoded data is read from the code memory 125, decompressed by the code processing unit 124, stored in the image memory 123, rotated by the rotation processing unit 126 according to the designation from the CPU 441, returned to multi-value data by the multi-value processing unit 122, and transferred to the printer control unit 430.

(3) Structure of Control Unit 200

The following is an explanation of the control unit 200.

Figure 6:
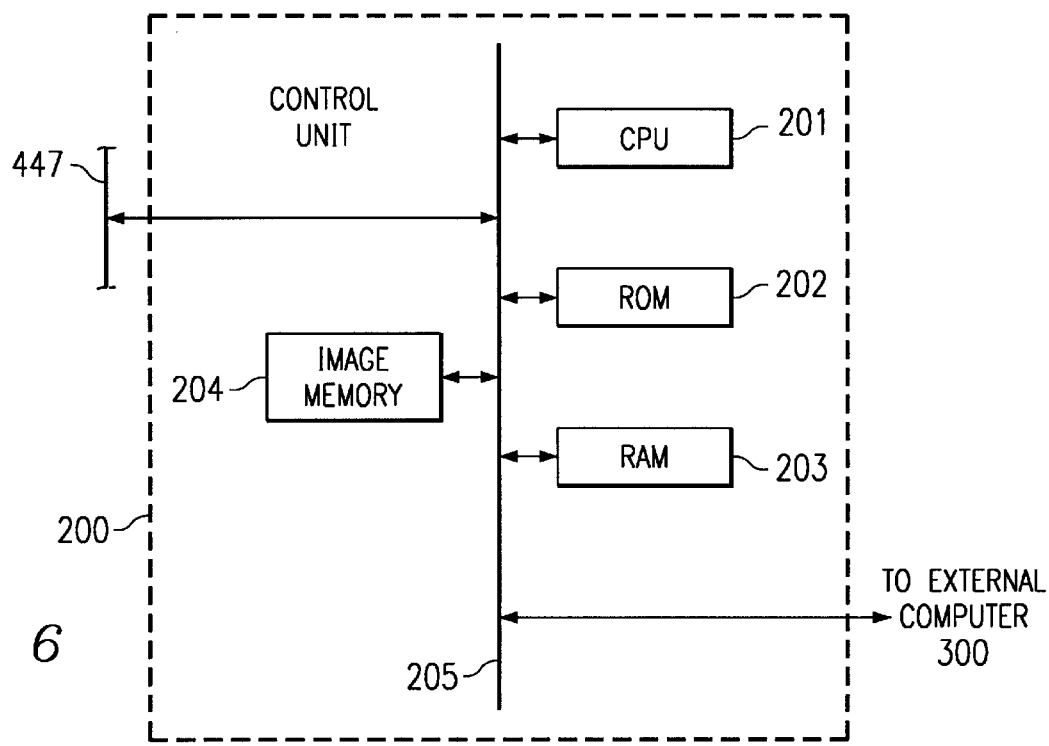
FIG. 6 is a block diagram of the control unit.

As shown in the block diagram in FIG. 6, the control unit 200 includes a CPU 201, a ROM 202, a RAM 203, and an image memory 204 which are connected to each other via a data bus 205.

The ROM 202 stores commands from the external computer 300 (see FIG. 1), a translation program for translating the commands from the external computer 300 into the machine language for the CPU 441 in the controller 400, and a program for image data processing necessary for performing various copy modes.

The RAM 203 stores the information of the processing ability of the copier 100 and also provides a work area for image data processing performed by a processing program of the control unit 200. The image memory 204 temporarily stores the image data that has been subjected to the image data processing. This image memory 204 is not necessary when the image memory 123 in the memory unit 120 of the copier 100 can store the image data subjected to the image data processing in the control unit 200 instead of the image memory 204.

The control unit 200 as described above may be attached to the side of the copier 100 as shown in FIG. 1 with bolts or fixtures as necessary. In other cases, the circuit board of the control unit 200 without a housing may be provided inside the copier 100 and connected to the data bus 447 of the controller 400 and the data bus of the external computer 300 respectively via connectors not shown in the figure.

Note that the external computer 300 is a general-purpose personal computer including a CRT display 301, a CPU main body 302 that includes an internal memory and a read device for reading data such as from floppy disks and CD-ROMs, and an input unit 303 including a keyboard and a mouse. The external computer 300 acts as an external copy mode setting device by starting application software for setting copy modes (hereinafter called "an application").

(4) Operation for Setting Copy Mode or the Like from the External Computer

The following is an explanation of a print operation by setting copy mode or print mode from the external computer 300. The explanation deals with a case where "8-in-1" copy mode is set. In the "8-in-1" copy mode, image data of 8 pages is reduced so as to fit on one page, the positions of the image data of each page are rearranged, and the images are formed on one copy sheet (hereinafter "N in 1" (where N=1, 2, 3, . . . ) means a copy mode for reducing images of N pages so as to fit on one page, arranging the positions of the image data of each page at will, and forming the images on one copy sheet). Note that "copy mode" or "print mode" in this specification includes ordinary operations such as multi-copies as well as image editing which requires various data processing, such as the "8-in-1".

Figure 7:
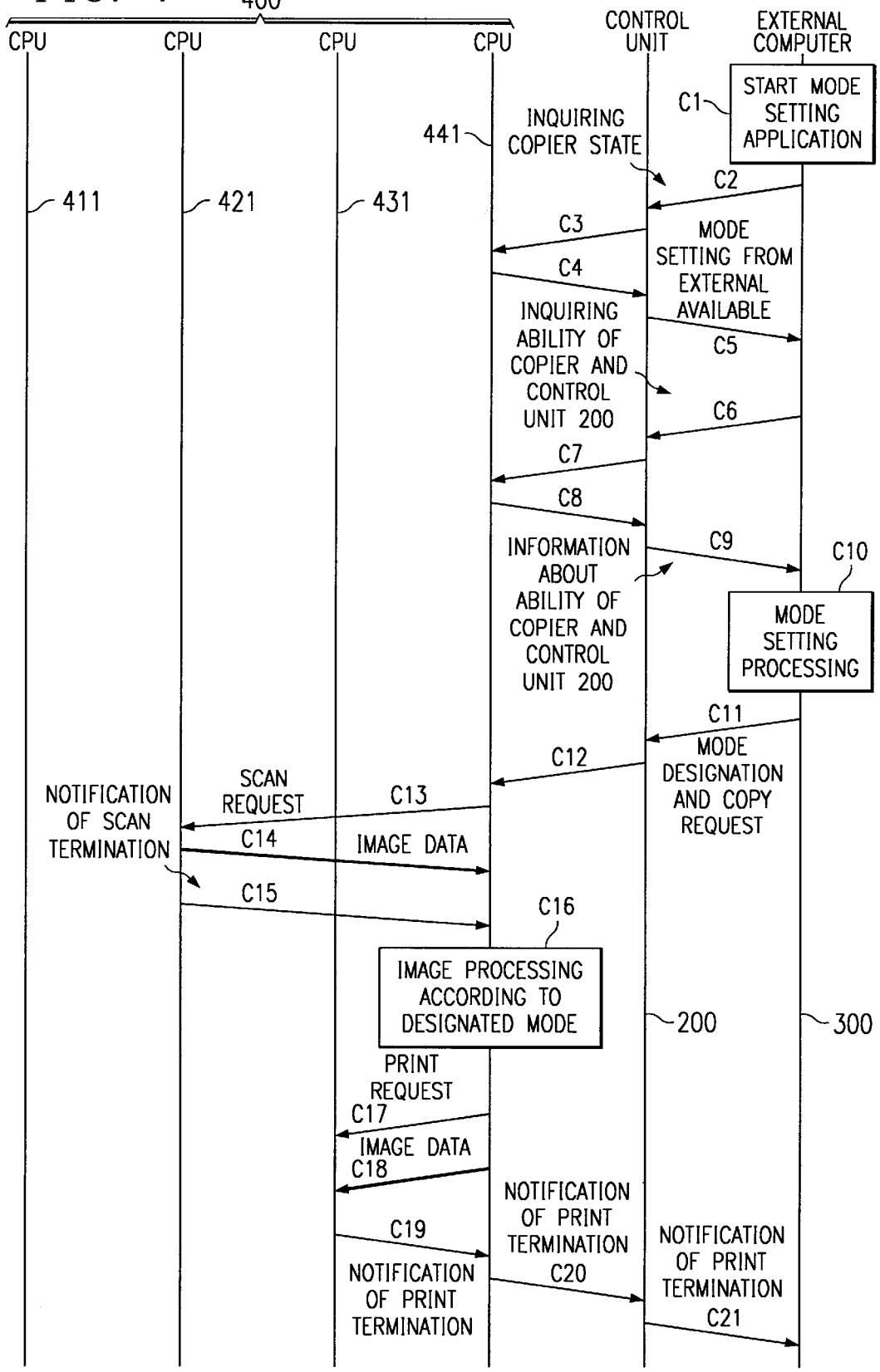
FIG. 7 is a sequence diagram showing the command flow when an external computer issues a copy request to the copier.
Figure 8:
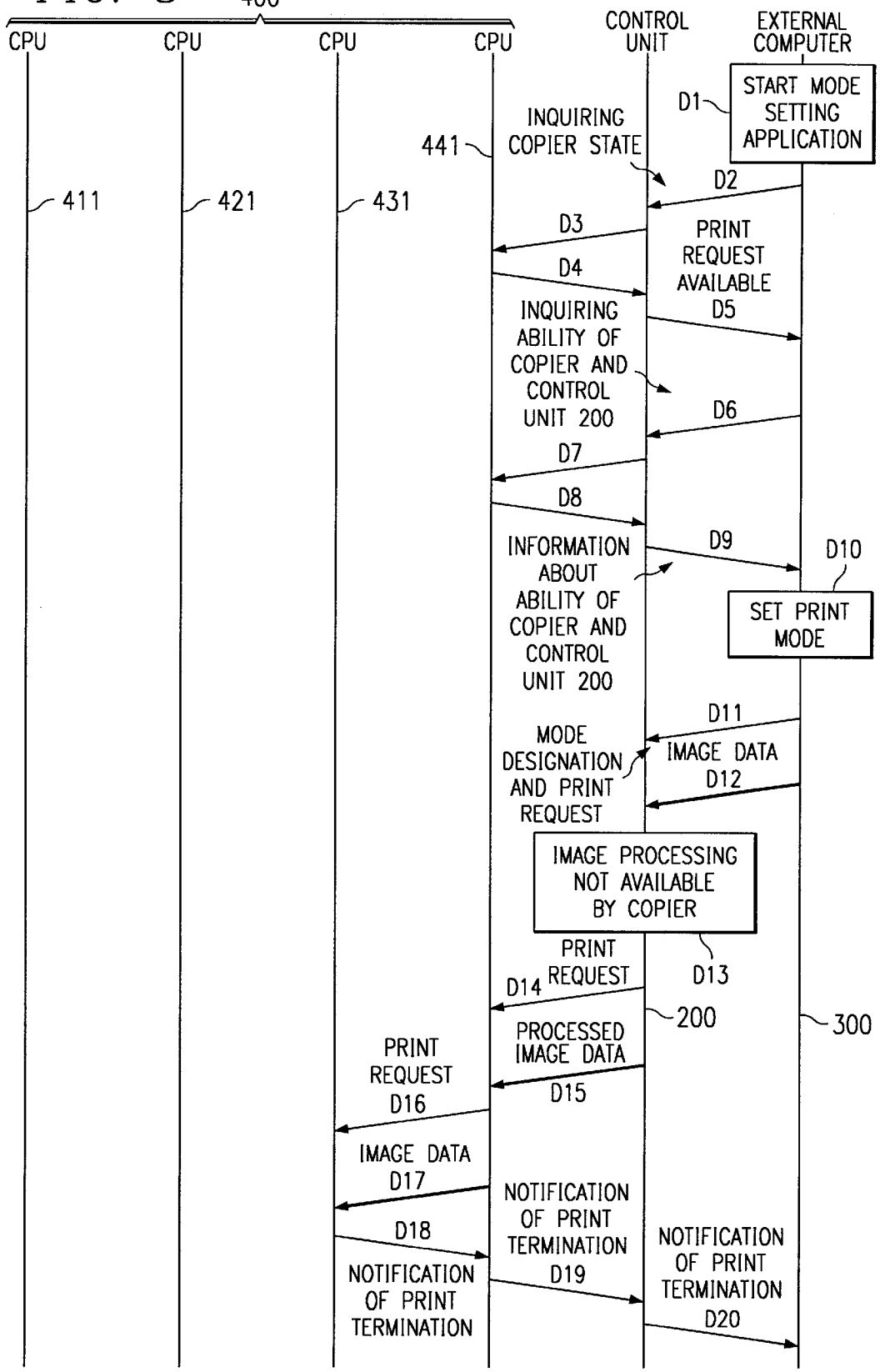
FIG. 8 is a sequence diagram showing the command flow when the external computer transmits a print request to the copier.

Firstly, the simplified flow of commands in the case where control is performed from the external computer 300 is explained, with reference to FIGS. 7 and 8. Then the operation of each unit during the command processing is explained in detail, with reference to flowcharts in FIGS. 9 to 19.

(4-1) Overall Flow of Commands

FIGS. 7 and 8 are sequence diagrams showing the overall flow of commands in the case where the mode of the copier 100 is designated from the external computer 300 and performed by the copier 100. The following explanation is divided into two cases, which are the case where the controller 400 of the copier 100 can process data for the "8-in-1" copy and the case where only the control unit 200 has the data processing ability.

(4-1-1) Case Where the Controller 400 Has Data Processing Ability of "8-in-1"

FIG. 7 is a chart showing the flow of commands (thin arrows in the figure) and image data (thick arrows in the figure) when copying is performed according to a designation received from the external computer 300 (there is a case where it is simply referred to as "the external" in drawings). This can happen when the controller 400 (more specifically, the ROM 442 in the main control unit 440) in the copier has the data processing program for the "8-in-1" copy mode, but the content of the mode requires complex instructions (such as sorting) which cannot be properly made using the operation panel 80 of the copier.

An instruction from the external computer 300 to form images according to image data read by the image reader unit 30 of the copier 100 is hereinafter called "a copy request", and to form images according to image data provided by the external computer 300 is hereinafter called "a print request".

In FIG. 7, an operator starts an application for setting A copy mode in the external computer 300 (C1). Then the external computer 300 instructs the control unit 200 to inquire of the controller 400 about the present input state of operation panel 80, namely whether copy mode can be set from the external computer (C2), and the control unit 200 translates and transmits this inquiry to the controller 400 (C3).

After receiving this inquiry, the CPU 441 of the controller 400 inquires of the RAM 413 of the operation panel control unit 410 about the present state for setting operation mode, and the result is transmitted to the external computer 300 via the control unit 200 (C4, C5). When the result indicates that inputting from the external computer is available, the external computer inquires of the control unit 200 about the processing abilities of the control unit 200 and the controller 400 (C6).

The control unit 200 translates the inquiry command, transmits the translated command to the CPU 441 (C7), and transmits information about data processing ability of the control unit 200 itself with the information obtained from the CPU 441 to the external computer 300 (C8, C9). The external computer 300 displays the received information, for example, as the mode setting screen on the display 301.

On viewing the displayed screen, an operator selects the desired copy mode "8-in-1" and specifies other settings, such as a page arrangement, using the input unit 303, such as the mouse of the external computer 300. The external computer 300 issues a copy request to the control unit 200 so that the copy is made in the mode designated by the operator (C10, C11).

In this case, the controller 400 of the copier 100 processes image data in the "8-in-1" mode. As a result, the mode setting command and the copy request command are sent to the CPU 441 of the controller 400 via the control unit 200 (C12). The CPU 441 instructs the CPU 421 to scan the original documents (C13). The original documents are transported to the document glass plate 31 one after another by the automatic document transport unit 10 and are scanned by the scanner 33 to obtain image data. The image data is subjected to necessary correction processing, transmitted to the main control unit 440 via the image data line 460 (C14), and, as described above, is written in the code memory 125 of the memory unit 120 after having been encoded. On this writing processing, a monitor table is generated which shows memory areas and encoded data stored in the memory areas in units of pages. The encoded data is read by referring to the monitor table.

After the scanning of all 8 pages is completed, the CPU 441 is informed of the completion (C15), and the CPU 441 reads the "8-in-1" data processing program from the ROM 442 and performs the data processing (C16).

This "8-in-1" data processing operation is performed in the following steps, for instance.

The encoded data of target pages is read from the code memory 125 of the memory unit 120 (see FIG. 5) by referring to the monitor table, is subjected to decompression processing, and is temporarily written in the image memory 123. The CPU 441 reads image data in the image memory 123 and reduces the image data to ⅛ in size. More specifically, image data represented by a pixel area of one page size is converted to a pixel area which is ⅛ in size through a bit-map conversion. The converted image data is written in a memory area in the image memory 123 which corresponds to an arrangement specified from the external computer 300.

When the data processing of all 8 pages is completed after the read, reduce, and write operations, the CPU 431 of the printer control unit 430 receives a print request (C17). At the same time, the processed image data is read from the image memory 123, and is further subjected to rotation processing by the rotation processing unit 126 as necessary. The image data is then converted to multi-value data by the multi-value processing unit 122 and transmitted to the CPU 431 (C18).

The CPU 431 transmits the image data to the print processing unit 130 and at the same time controls the operations of the printer unit 50 and the sheet feeding unit 70 to reproduce the image data of the "8-in-1" copy mode on a copy sheet. After the printing is completed, the CPU 441 is informed of the completion (C19) and transmits the completion notification to the external computer 300 via the control unit 200 (C20, C21). With this, the operation of the "8-in-1" copy mode is completed.

(4-1-2) Case Where "8-in-1" Data Processing is Performed by the Control Unit 200

FIG. 8 is a chart showing the flow of commands (thin arrows) and image data (thick arrows) in the case where not the controller 400 of the copier but the ROM 202 of the control unit 200 stores the "8-in-1" data processing program and image data generated by the external computer 300 is requested to be printed.

Note that the printing by a print request described above should be called "print mode" instead of "copy mode" but both modes will be simply called "mode" because both modes have the same operation, such as the same data processing. Operations which are the same as in (4-1-1) will only be described in outline, or will not be described.

In FIG. 8, an operator starts an application for setting copy mode from the external computer 300 (D1). The external computer 300 then instructs the control unit 200 to inquire of the controller 400 about whether the setting of modes is available from the external computer (D2, D3) and obtains the response from the CPU 441 via the control unit 200 (D4, D5).

If the information indicates that mode setting is available from the external computer, the external computer 300 inquires of the control unit 200 about processing ability of the control unit 200 and the controller 400 (D6).

The control unit 200 translates the ability inquiry command, transmits the translated command to the CPU 441 (D7), and transmits the response from the CPU 441 with the response about the data processing ability of the control unit 200 itself to the external computer 300 (D8, D9). The responses are displayed as a mode setting screen on the display 301 of the external computer 300.

In this state, the operator sets the desired "8-in-1" mode from the mode setting screen using the mouse and further makes other settings such as the storage location of the data (D10). The external computer 300 transmits a print request command to the control unit 200 to print in the mode set by the operator and also transmits the image data for the 8 pages to be printed (D11, D12).

In this case, the control unit 200, not the controller 400 of the copier 100, can perform "8-in-1" data processing so that the control unit 200 subjects the image data to "8-in-1" processing by the same method as described above (D12) and transmits the processed image data with a print request to the CPU 441 (D14, D15).

The CPU 441 transmits print request and the image data which were received from the control unit 200 to the CPU 431 of the printer control unit 430 (D16, D17). The CPU 431 transmits the image data to the print processing unit 130 (see FIG. 4). The CPU 431 also integrally controls the operation of units, such as the printer unit 50 and the sheet feeding unit 70, to print out the "8-in-1" image on a copy sheet. After that, the CPU 431 informs the CPU 441 that printing is completed (D18) and the CPU 441 transmits the completion notification to the external computer 300 via the control unit 200 (D19, D20). Note that FIG. 7 and FIG. 8 respectively illustrates a copy request and a print request, although it is possible for a print request to be performed by the steps in FIG. 7 and a copy request by the steps in FIG. 8.

(4-2) Control Operation of Each Unit

The following is the detailed explanation of the control operation of each unit referring to the command flow described above.

Figure 9:
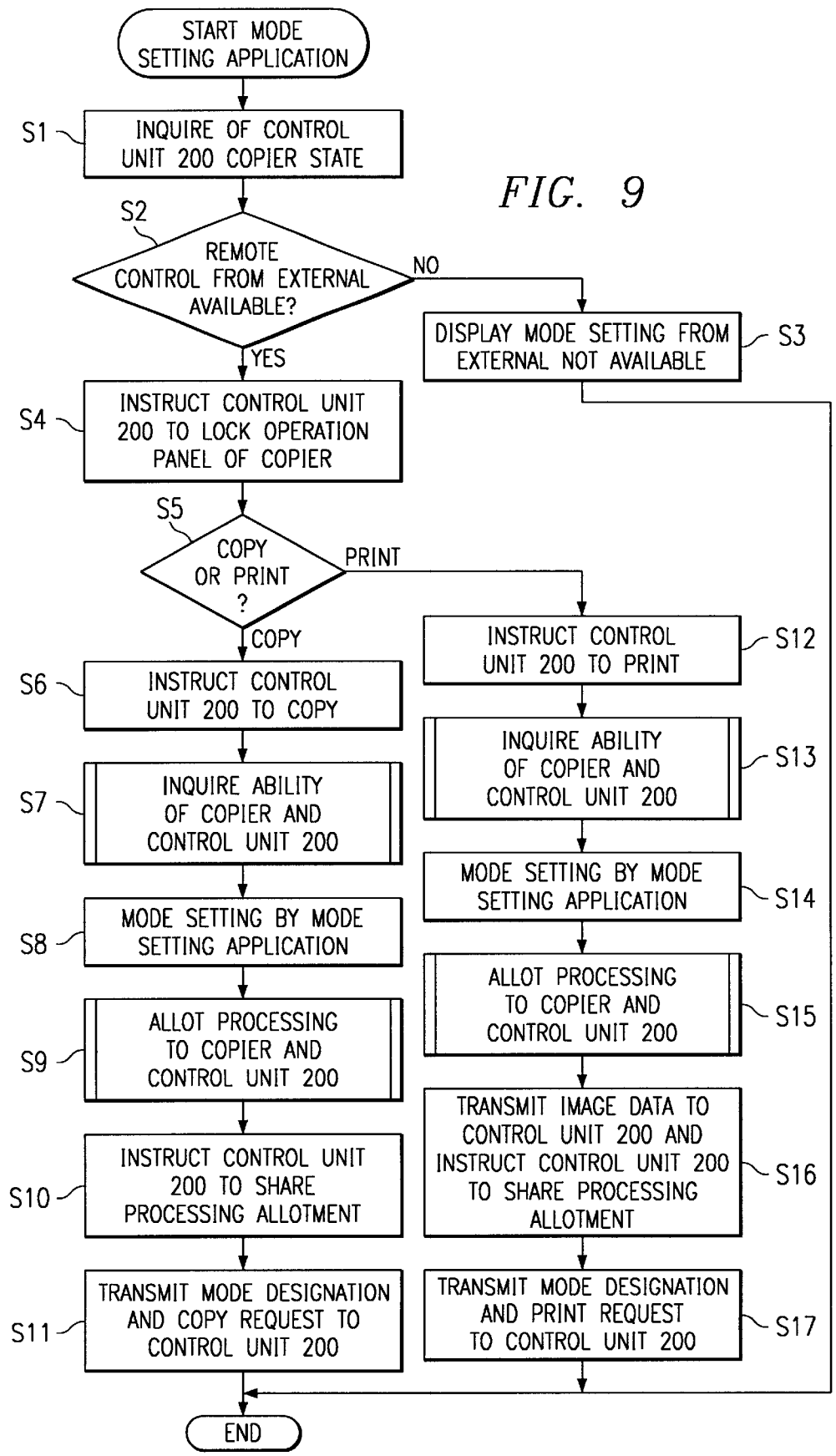
FIG. 9 is a flowchart showing an operation when the external computer transmits a copy request or a print request to the copier.

FIG. 9 is a flowchart showing the operation of a copy request or a print request when the external computer 300 starts a mode setting application.

After the external computer 300 starts the mode setting application, a command to inquire of the control unit 200 about the setting state of the copier 100, namely information about whether an operation is available from the external computer, is automatically issued (S1).

The control unit 200 translates the command and transmits the translated command to the CPU 441 of the controller 400. As described above, the operation panel 80 of the copier 100 includes the operation panel switching key 88 whose state is stored in the RAM 413. The CPU 441 inquires of the RAM 413 of the operation panel control unit 410 about the setting state and transmits the inquiry result to the external computer 300 via the control unit 200.

Figure 10:
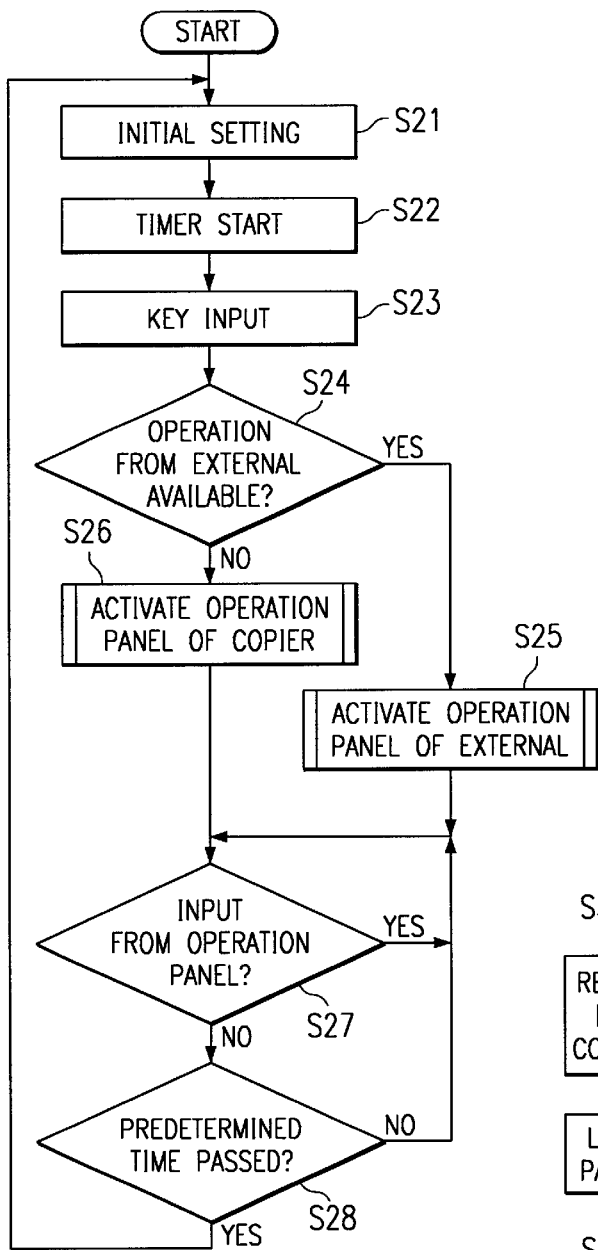
FIG. 10 is a flowchart showing a switching operation of the operation panel by the operation panel control unit.

FIG. 10 is a flowchart showing the setting operation of the operation panel switching key 88 of the operation panel control unit 410.

After the copier 100 is switched on, the CPU 411 reads the panel display program stored in the ROM 412 and data of the initial display mode stored in the NVRAM 415, and initializes the setting of the operation panel 80 to display the initial screen on the liquid crystal touch panel 81 (S21).

At the same time, the internal timer of the CPU 411 starts to measure time (S22). If an operator pushes the operation panel switching key 88 to select the input operation from the external computer 300, the lamp 882 which indicates that the input operation from the external operation panel is available is illuminated (S23,S24,S25); if the operator selects the input operation from the operation panel 80 of the copier 100, the lamp 881 which is initially set is illuminated (S26). The setting of the operation panel described above is stored in the RAM 413.

If a predetermined time Period has passed without any input in the waiting state, where an input from the operation panel of the copier or the external computer is awaited, the panel display program stored in the NVRAM 415 resets the operation panel 80 to the initial display mode (S27, S28).

Figure 20:
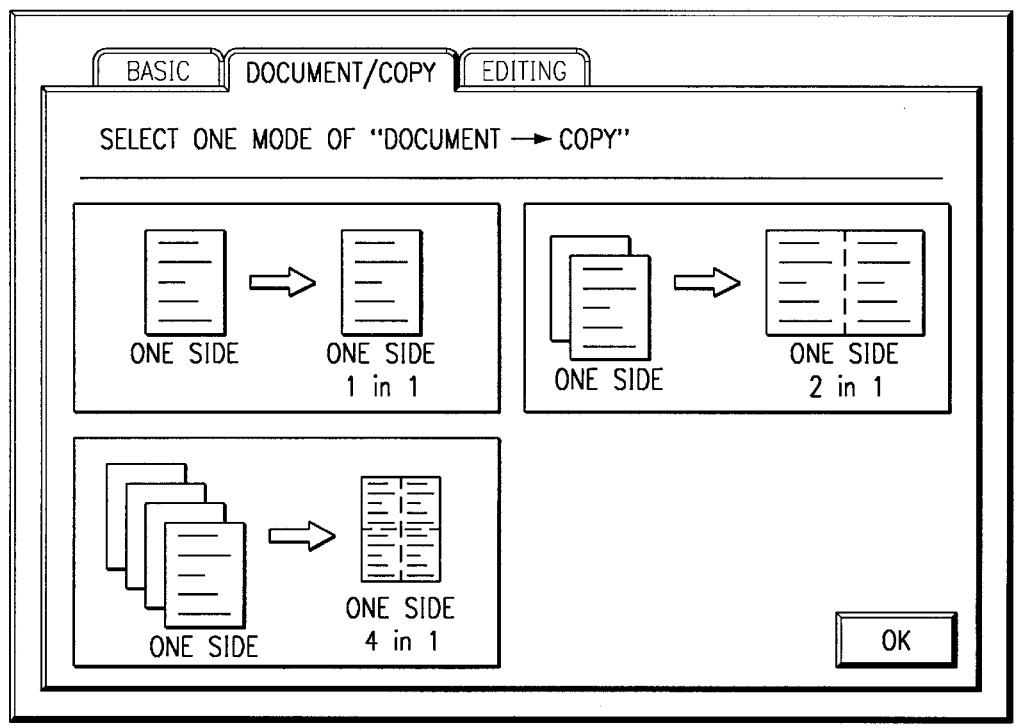
FIG. 20 shows an example of a mode setting screen displayed on the operation panel of the copier.

Returning to the flowchart of FIG. 9, when the input operation from the external computer is not available, namely when the current mode allows only inputs from the operation panel 80, the display 301 of the external computer 300 displays a message indicating that the setting of mode from the external computer is not available and the external computer 300 terminates the operation (S2, S3). In this case, a copy mode is set from the operation panel 80 of the copier 100, a mode setting screen such as the one shown in FIG. 20 is displayed on the liquid crystal touch panel 81, and the operator can set a copy mode by touching a representation of the desired mode on the panel.

Figure 21:
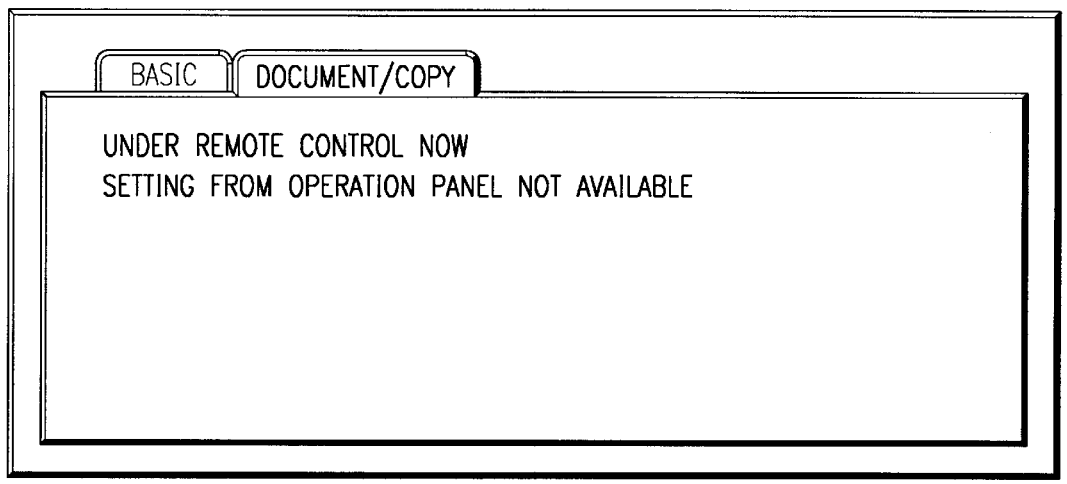
FIG. 21 shows an example of a message displayed on the operation panel of the copier when a copy mode is set from the external computer.

To the contrary, if it is possible to input from the external computer, the external computer 300 instructs the control unit 200 to block inputs from the operation panel 80 of the copying apparatus 100 (S4). In this case, the liquid crystal touch panel 81 of the copier 100 displays a message such as that shown in FIG. 21 to prevent the operator from making a mistaken input via the liquid crystal touch panel 81.

Figure 22:
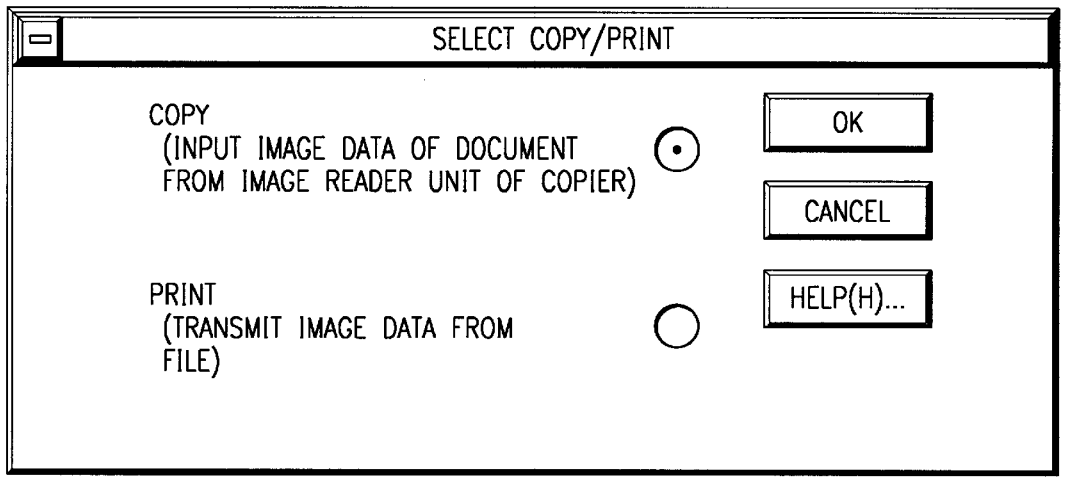
FIG. 22 shows an example of the operation setting screen when a copy mode is set from the external computer.

In step S5, after receiving an input from the operator, the external computer 300 judges which of a copy operation and a print operation is selected. The display 301 of the external computer 300 displays a menu screen as shown in FIG. 22. The operator moves a cursor to either "COPY" or "PRINT", clicks the left mouse button, and then clicks on the "OK" button to determine the selected mode, where "to click" means to select an item on a screen using the mouse.

Figure 11:
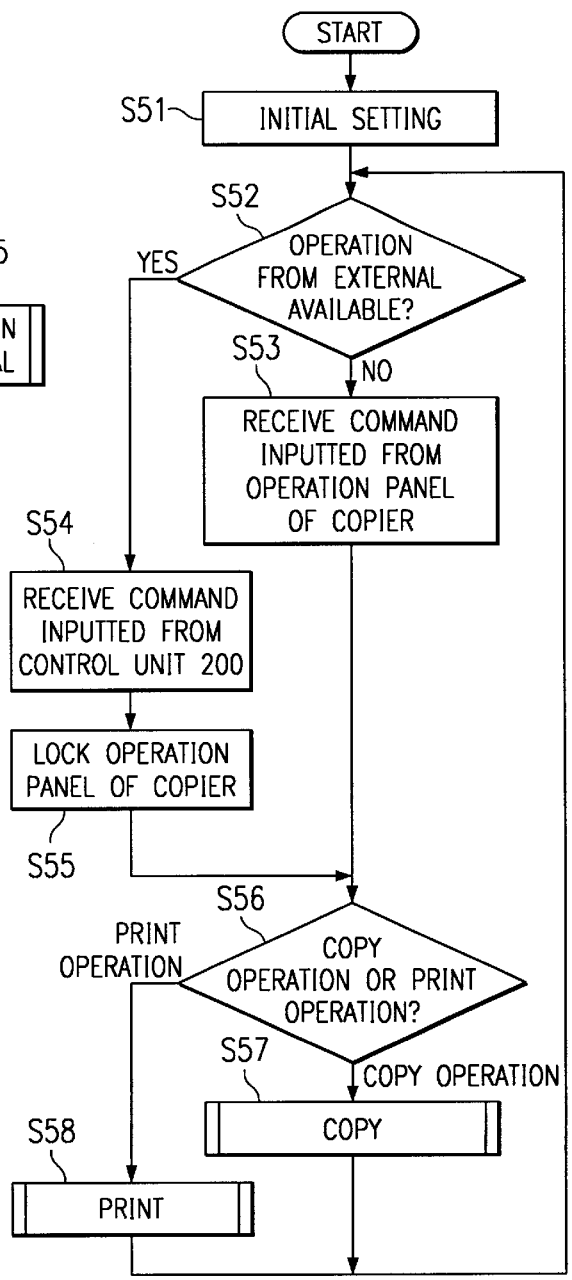
FIG. 11 is a flowchart showing operations from panel switching to selection of a copy or print operation in a main control unit.

FIG. 11 is a flowchart showing the operation of the main control unit 440, corresponding to inputs from the operation panel switching operation as described above.

After being switched on, the main control unit 440 performs initialization using a control program stored in the ROM 442 (S51), and confirms the present setting of the operation panel switching key 88 by referring to data in the RAM 413. According to the confirmation result, the ROM 442 receives a command inputted from either the operation panel 80 of the copier or the control unit 200 (S53, S54). In the latter case, the main control unit 440 further instructs the CPU 411 of the operation panel control unit 410 not to receive an input from the operation panel 80. This instruction is executed when the main control unit 440 receives an instruction from the external computer 300 to lock the operation panel of the copier (S4 in FIG. 9) (S55)

A copying operation or a printing operation is performed according to a copy request from the operation panel 80 of the copier, or a copy request or print request from the external computer 300 (S56, S57, S58). These operations are described later (see FIGS. 14 and 18).

If the operator selects a copying operation in S5 in FIG. 9, the external computer 300 instructs the control unit 200 to perform a copying operation (S6) and inquires of the control unit 200 and the copier 100 about their data processing abilities (S7).

Figure 12:
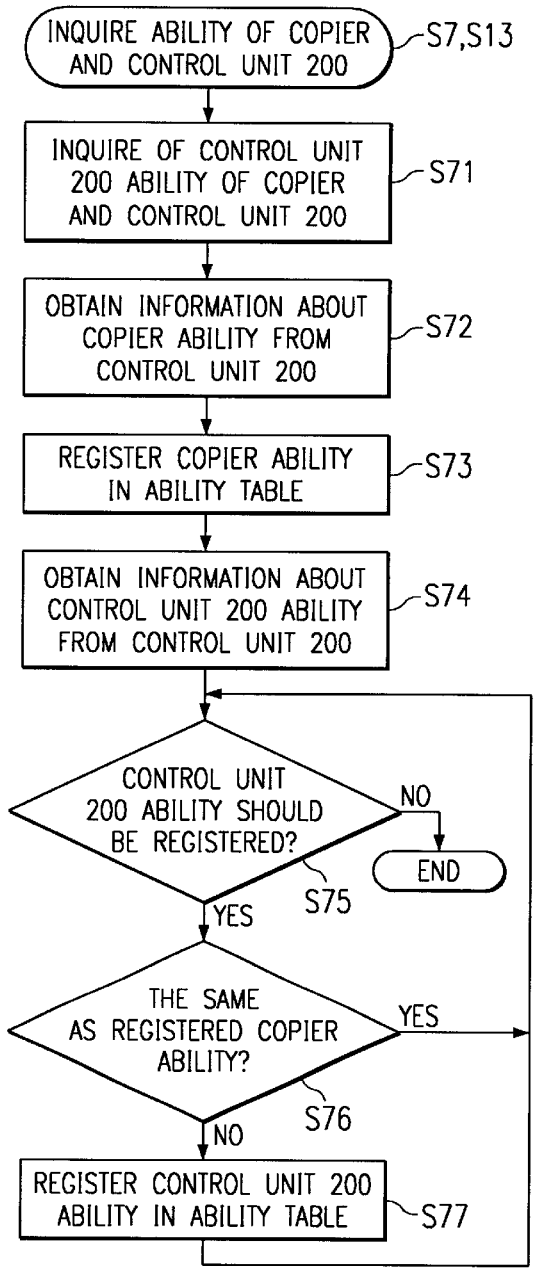
FIG. 12 is a flowchart showing an operation when the external computer inquires of the control unit about the data processing ability.

FIG. 12 is a flowchart showing the operation of inquiry about the data processing ability (S7, S13). As shown in the figure, after the external computer 300 instructs the control unit 200 to inquire of the control unit 200 itself and the copier 100 about their data processing abilities (S71), the control unit 200 translates the inquiry command, transmits the translated command to the main control unit 440, receives a response about the data processing ability of the copier 100 from the main control unit 440, and transmits the response to the external computer 300. After receiving the response, the external computer 300 registers the response in a memory area of the mode setting application as an ability table (S72,S73) and receives a response about the data processing ability of the control unit 200 (S74).

The external computer 300 judges whether the control unit 200 has a data processing ability which should be registered in the ability table (S75). If so, the external computer 300 judges whether the processing ability is the same as the processing ability of the copier 100 which has already been registered (S76). If not, the processing ability is registered in the ability table as the function of the control unit 200 (S77) if so, the routine returns to S75 and another processing ability which should be registered is searched for. If there is another processing ability which should be registered, the operations in the S76 and S77 as described above are repeated; if there is not, the operation for inquiring the data processing ability is terminated.

By doing so, a response about data processing ability is obtained from the control unit 200 and the registration of the processing ability and the ability table is completed. After that, returning to S8 of FIG. 9, the operator sets the mode using the external computer 300.

Figure 23:
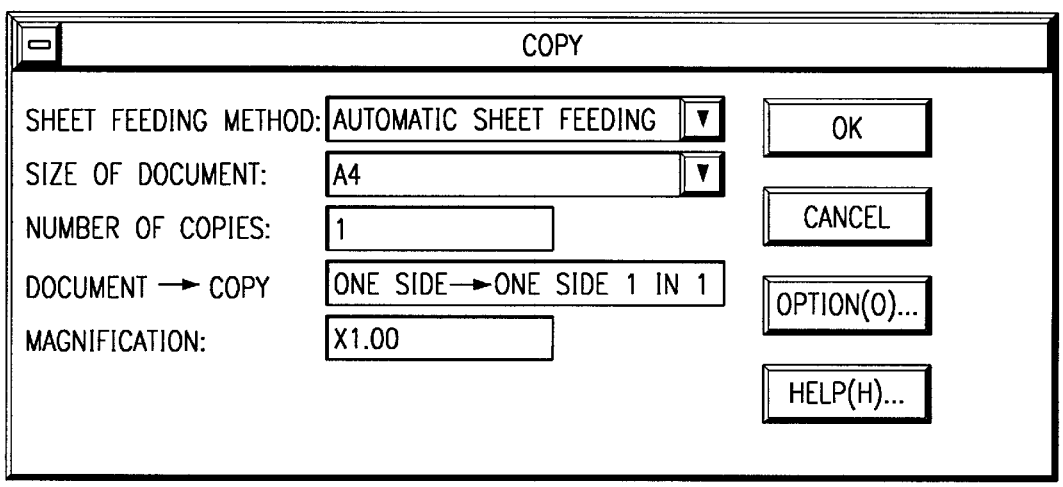
FIG. 23 shows an example of the mode setting screen when "COPY" operation is selected when the operation setting screen in FIG. 22 is displayed.
Figure 24:
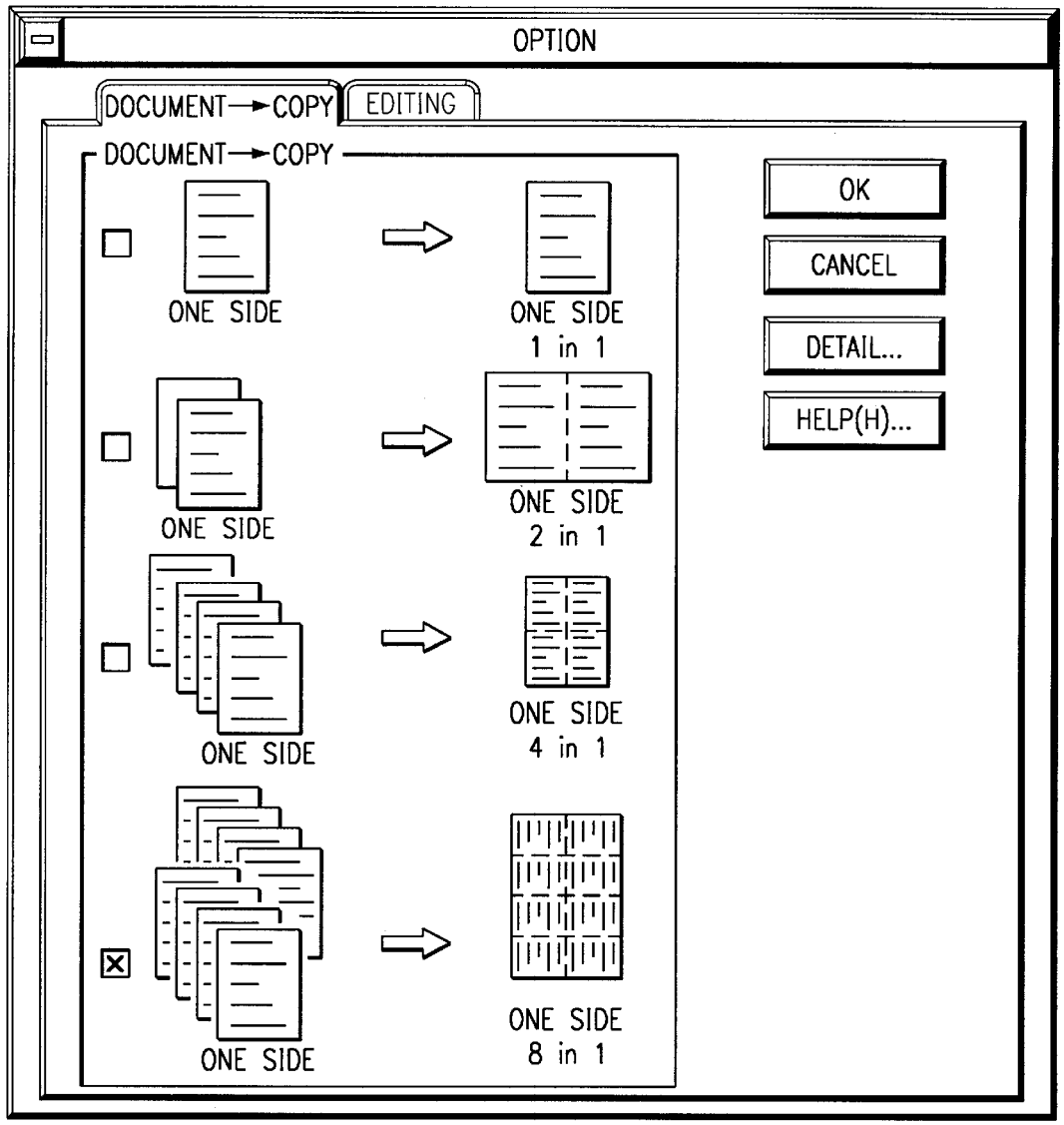
FIG. 24 shows an example of the mode setting screen which is displayed when "OPTION" is selected when the mode setting screen in FIG. 23 is displayed.
Figure 25:
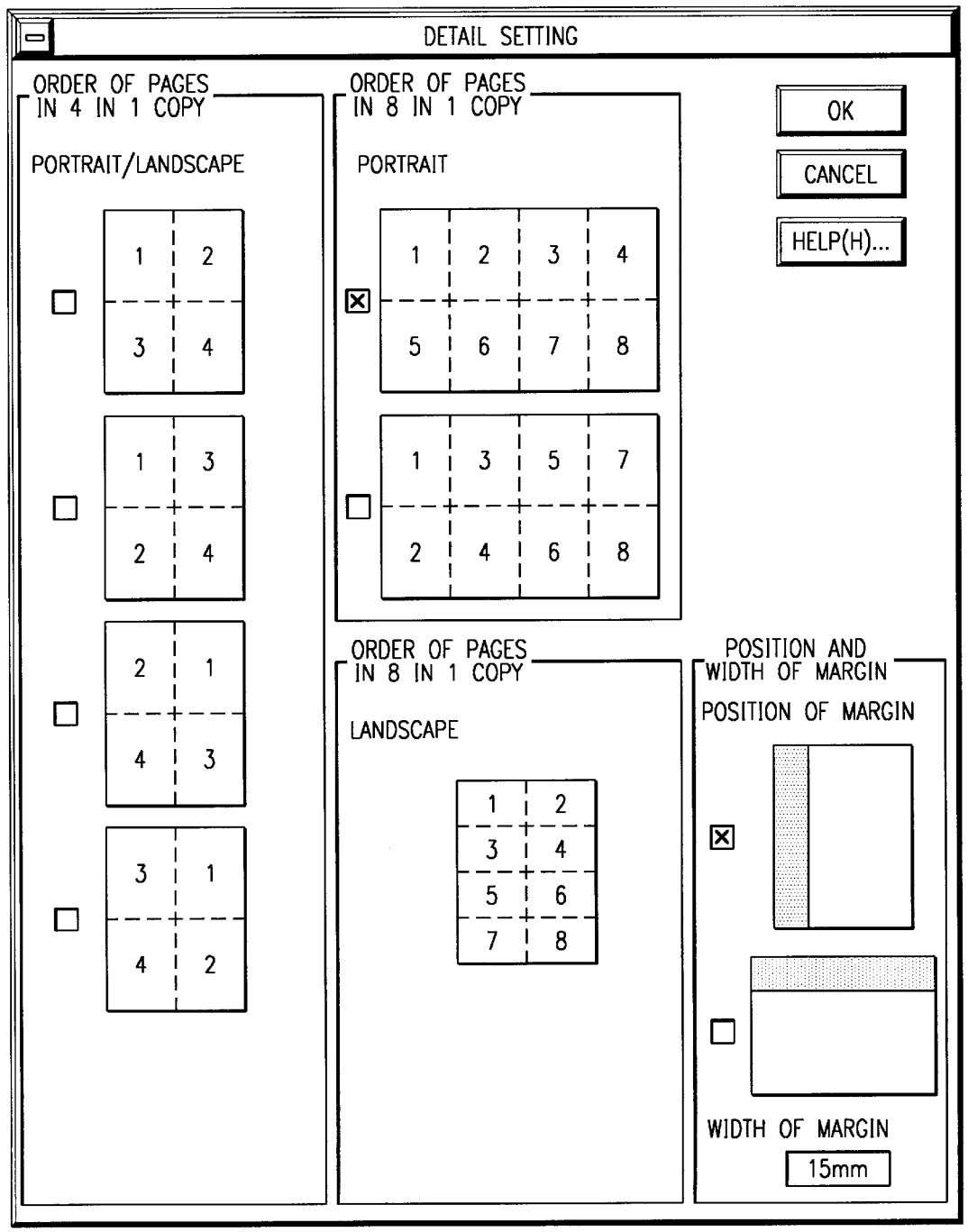
FIG. 25 shows an example of the mode setting screen which is displayed when "DETAIL" is selected when the mode setting screen in FIG. 24 is displayed.

During the mode setting, the display 301 sequentially displays the mode setting screens shown in FIGS. 23–25. The operator designates sheet feeding method, the size of original documents, and copy mode (here the copy mode is the one-sided copy mode, two-sided copy mode or the like, and all initial settings are "1-in-1" in this state).

After clicking on "OPTION" in the screen, an option mode setting screen as shown in FIG. 24 is displayed. The operator sets a desired copy mode on the screen and clicks on "DETAIL" so that a detail setting mode screen as shown in FIG. 25 is displayed. Necessary settings such as the print order or the width of the margins can be set from the screen.

By doing so, the operator finishes the mode setting. In S9 in FIG. 9, it is determined which of the copier 100 and the control unit 200 performs each processing, according to the information about their respective abilities as described above, to execute the mode.

Figure 13:
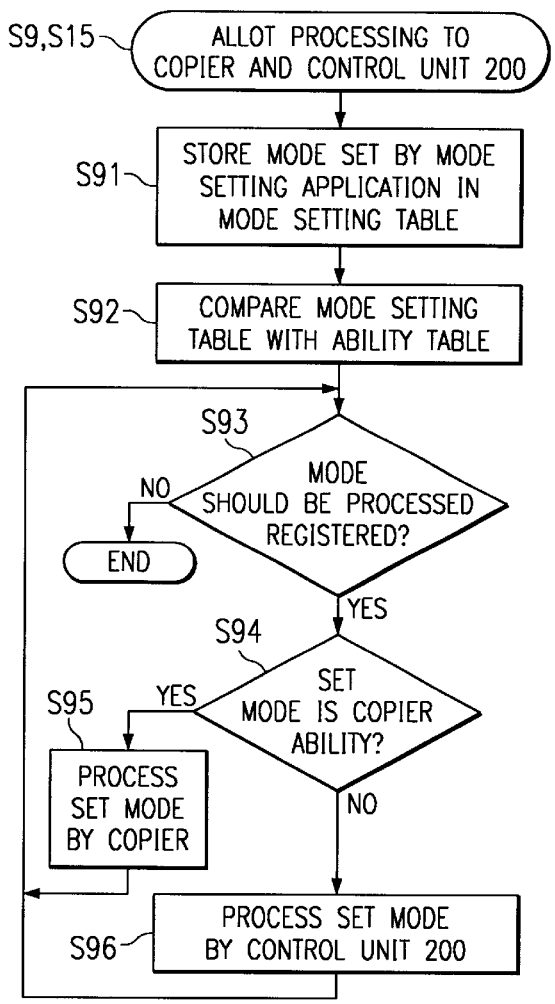
FIG. 13 is a flowchart showing an operation when the external computer allots data processing to the copier and the control unit, based on the mode setting application.

FIG. 13 is a flowchart of a subroutine in which the mode setting application determines a unit for performing the mode.

The mode set in S8 above is stored in a mode setting table (S91) and the contents of the mode setting table are compared with the registered contents of the ability table (S92).

If the processing ability corresponding to a desired mode is registered in the ability table, it is judged whether the mode is a function of the copier 100. If so, the mode is performed by the copier 100 (S93, S94, S95); if not, it is judged that the mode is a function of the control unit 200 and the mode is performed by the control unit 200 (S96). The subroutine returns to S93 after either of the units is determined for performing the mode. In this state, it is judged whether another mode needs to be performed. If judged so, the operations in S94–S96 are repeated; if not so, the operation of the unit allotment is completed.

When the operator sets "8-in-1" copy mode and enlarged copy, the control unit 200 can perform "8-in-1" copy mode and the copier 100 can perform other modes, the enlargement processing is allotted to the copier 100 and the "8-in-1" processing is allotted to the control unit 200. Needless to say, if the copier can perform "8-in-1", no processing is allotted to the control unit 200; if the copier 100 cannot perform the enlarged copy while the control unit 200 can, the control unit 200 performs all the processing.

In FIG. 9, after the processing is allotted in S9, the control unit 200 is informed of the processing allotment (S10) and other designated modes, such as the number of copies, and a copy request is issued (S11).

On the other hand, if a print operation is designated in S5, the operations of S12 to S17 are performed. The operations are basically the same as the operations of S6 to S11 except that image data subjected to data processing is obtained from the external computer 300, not from the image reader unit 30 of the copier 100.

The following is the brief explanation of a print operation. When the operator clicks on "PRINT" in the mode setting screen in FIG. 22, the external computer 300 designates the control unit 200 to perform a print operation (S12) and processing ability of the copier 100 and of the control unit 200 is inquired (S13).

Figure 26:
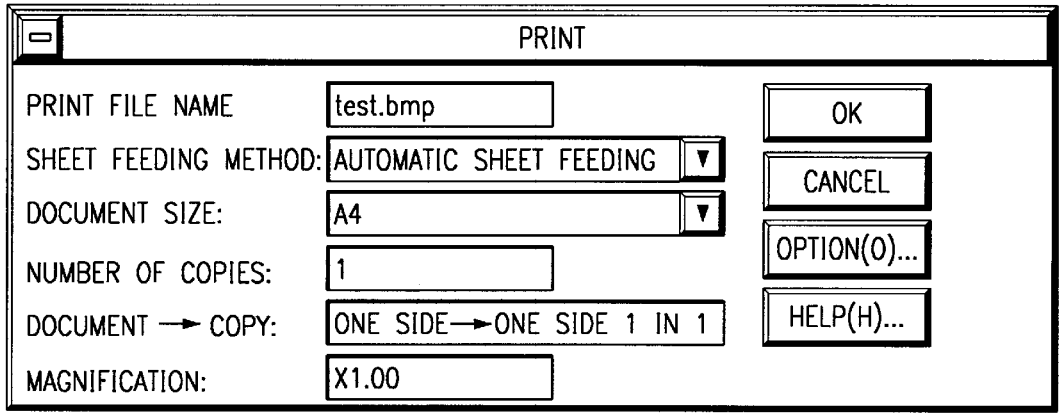
FIG. 26 shows an example of the mode setting screen which is displayed if "PRINT" operation is selected when the operation setting screen in FIG. 22 is displayed.

According to the response to the inquiry, the mode setting is performed by the mode setting application (S14). During the mode setting, the display 301 displays the mode setting screen as shown in FIG. 26. This mode setting screen for a print operation differs a little from the one for a copy operation (see FIG. 23) in that a box for setting a print file name is at the top of the screen, so that the file which stores data for the print can be set. The following option and detail settings are performed using the same mode setting screens as those shown in FIGS. 24 and 25 described above.

To perform the print mode, processing is allotted to the copier 100 and to the control unit 200 according to their data processing abilities (S15), image data in the set file is transmitted to the control unit 200, and the above unit allotment is specified (S16).

The designation of modes such as the number of copies and a print request are transmitted to the control unit 200 (S17).

By doing so, the mode setting operation performed according to the mode setting application in the external computer 300 is completed.

The following is the explanation of the control flow of a copy operation or a print operation after the main control unit 440 in the copier 100 receives a copy request or a print request from the external computer 300 as described above.

Figure 14:
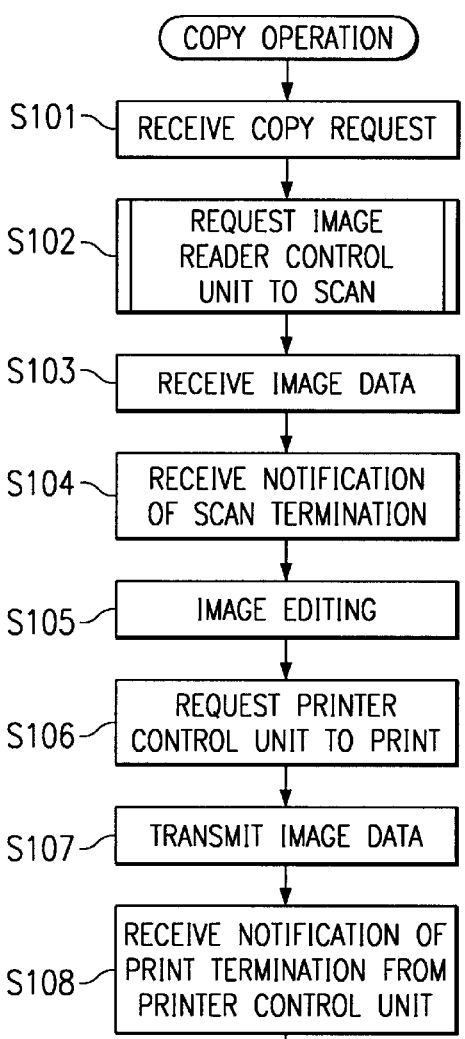
FIG. 14 is a flowchart showing the copying operation in the main control unit.

Firstly, the control flow of a copy operation by the main control unit 440 is described, with reference to FIG. 14.

On receiving a copy request from the external computer 300 via the control unit 200, the main control unit 440 requests the image reader control unit 420 to scan documents (S101, S102).

Figure 15:
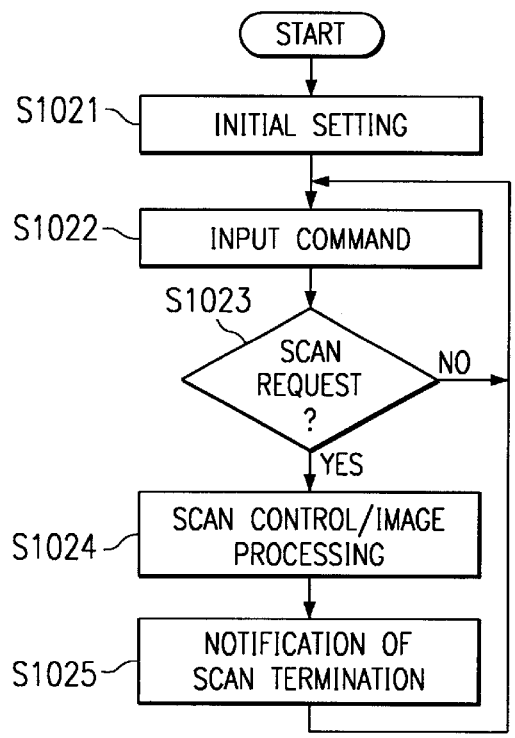
FIG. 15 is a flowchart showing the operation when the main control unit sends scan requests to an image reader control unit.

After receiving the scan request, the image reader control unit 420 controls the automatic document transport unit 10 and the image reader unit 30 to scan documents as shown in the flowchart in FIG. 15. More specifically, when the copier 100 is switched on, the initial state is set based on the program stored in the ROM 422 (S1021). When a command is inputted and the command is a scan request (S1022, S1023), the operations of the automatic document transport unit 10 and the image reader unit 30 are controlled and the necessary number of documents are read. The image data obtained by reading is processed by the image signal processing unit 110 as necessary (S1024), and the image data is transmitted to the main control unit 440 with a scan completion notification.

In FIG. 14 again, the main control unit 440 receives the image data and the scanning completion response (S103, S104), data processing is performed, and the image is edited based on the modes and on the unit allotment (S105) designated by the external computer 300 beforehand.

After the image editing is completed, the printer control unit 430 receives a print request and the image data which has already been edited (S106, S107).

Figure 16:
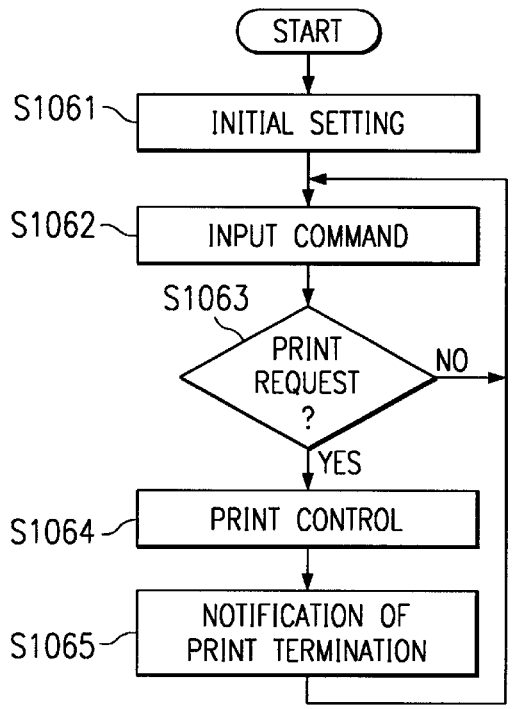
FIG. 16 is a flowchart showing the operation when the main control unit sends print requests to the printer control unit.
Figure 17:
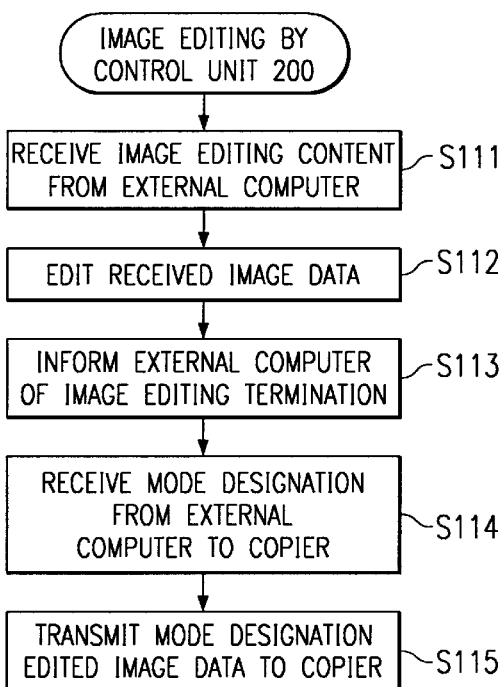
FIG. 17 is a flowchart of an image editing operation by the control unit.

Based on the request and image data, the printer control unit 430 operates as shown in FIG. 16 to form images.

More specifically, when the copier switched on, the printer control unit 430 is set to the initial state by the program stored in the ROM 432 (S1061). When a command is inputted and the command is the print request (S1062, S1063), the operations of the printer unit 50 and the sheet feeding unit 70 are controlled, thereby controlling printing operation (S1064). After the formation of the edited image data transmitted from the main control unit 440 is complete, the main control unit 440 receives the completion notification (S1065) and waits for another command to be inputted.

After being informed by the printer control unit 430 that the print is completed, the main control unit 440 terminates the print operation (S108 in FIG. 14).

Note that the explanation above is the case where the main control unit 440 performs the image editing corresponding to the set mode, according to a copy request from the external computer 300. However, when the control unit 200, not the copier 100, has the data processing ability corresponding to the copy mode designated by the operator, the image data read by the image reader unit 30 is transmitted to the control unit 200 and subjected to data processing therein, so that image editing is performed.

The following is the explanation of the image editing operation performed by the control unit 200 described above, with reference to the flowchart in FIG. 17.

After the CPU 201 (see FIG. 6) of the control unit 200 receives the processing allotment from the external computer 300 (S111), the editing program necessary for the image processing is read from the ROM 202 and the image data transmitted from the copier 100 is subjected to data processing based on the program, so that image editing is performed (S112).

After the image editing is completed, the CPU 201 informs the external computer 300 of the completion of the image editing (S113). The CPU 201 receives mode designations, such as the number of copies which is allotted to the copier 100, from the external computer 300 (S114) and transmits the mode designations and the image data which has already been edited to the main control unit 440 (S115).

After receiving the image data and mode designations, the main control unit 440 performs the operations of S106–S108 in FIG. 14, has the printer unit 30 performs the print operation through the printer control unit 430, and informs the external computer 300 that the printing is completed via the control unit 200.

Figure 18:
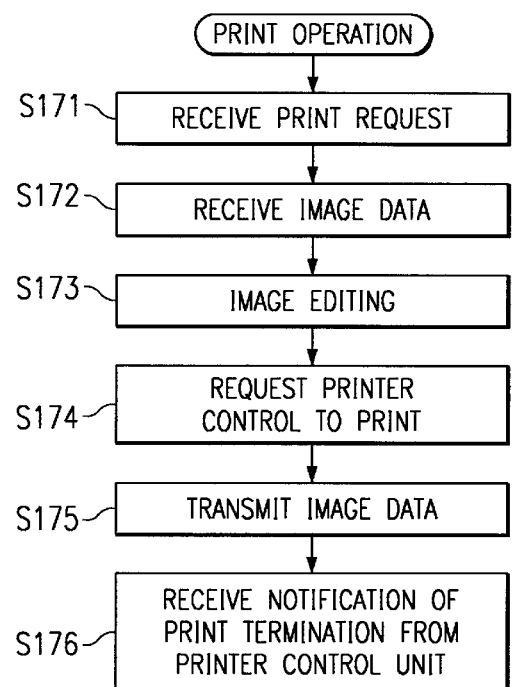
FIG. 18 is a flowchart of a print operation by the main control unit.

If the designation from the external computer 300 is a print operation, the main control unit 440 operates as shown in the flowchart in FIG. 18.

More specifically, after receiving a print request and the image data to he edited from the external computer 300 via the control unit 200 (S171, S172), the main control unit 440 processes the image data to perform image editing according to the designated mode (S173). If data processing is also allotted to the control unit 200, the main control unit 440 receives image data after the image data has been processed by the control unit 200. As a result, the main control unit 440 performs other processing.

After all the designated data processing and image editing is completed, the main control unit 440 transmits a print request and the image data which has already been edited to the Printer control unit 430 (S174, S175). The printer control unit 430 performs a print operation by the same operations as explained in FIG. 16. After the print is completed, the main control unit 440 is informed of the completion and completes the print operation (S176).

By doing so, the copier 100 performs a copy operation or a print operation according to a copy request or a print request set by the external computer 300, and the control unit 200 smoothly performs the transmission of commands and information between the copier 100 and the external computer 300.

Figure 19:
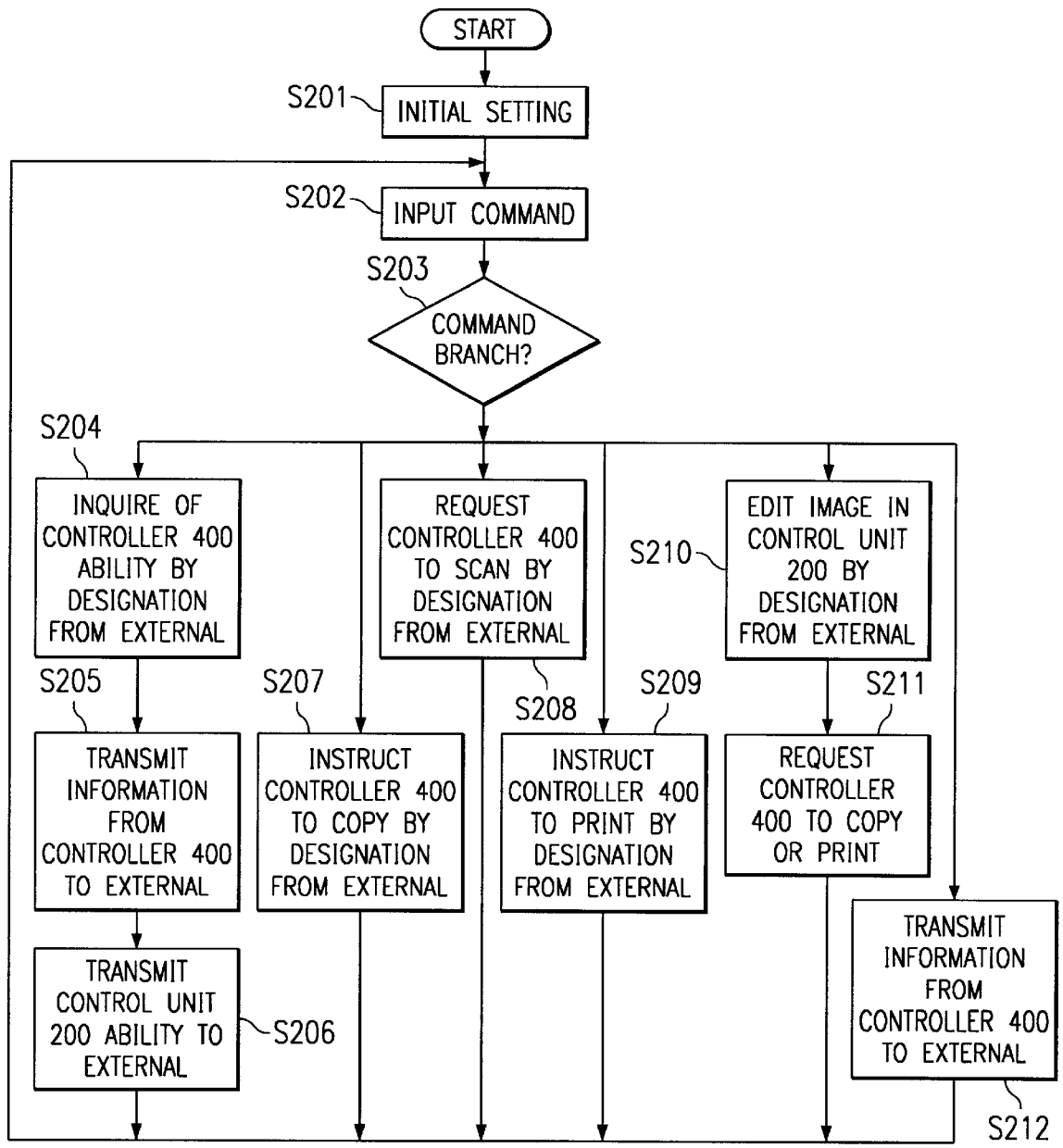
FIG. 19 is a flowchart showing the operation of the control unit.

The following is the explanation of the role played by the control unit 200 in each operation, with reference to FIG. 19. Note that the transmission of commands and other information from the control unit 200 to the external computer 300 and to the main control unit 440 is bound to involve translations into the machine language for the receiver. However, the translation operation is omitted in the following explanation to simplify the explanation.

After the copier 100 is switched on and the initial setting is performed by the initialization program in the ROM 202

(see FIG. 6) (S201), a command and a response from the external computer 300 or from the controller 400 are received and a command branch is performed based on the analysis of the contents of the command and the response (S202, S203).

If the received command is a designation from the external computer 300 for inquiring the data processing ability, the inquiry command is transmitted to the controller 400 and the response from the controller 400 is transmitted to the external computer 300 together with information of the data processing ability of the control unit 200 itself (S204, S205, S206).

If the control unit 200 shares image data processing, the control unit 200 receives a copy or print request from the external computer, performs the data processing, and transmits the processed image data and the copy or print request to the controller 400 (S210, S211).

The response, such as the report of scan completion, and the information about the processing ability is translated and transmitted to the external computer 300 (S212).

As described above, the control unit 200 is a mediator between the external computer 300 and the copier 100, and transmits the designation of image editing from the external computer 300 to the controller 400 and the response from the controller 400 to the external computer 300. Therefore, modes which cannot be set from the copier 100 can be easily set from the external computer 300. Further, if the control unit 200 has a data processing ability which is not present in the controller 400, the control unit 200 performs the data processing so that various modes can be achieved.

The control unit 200 also can be separated from the copier 100 so that only basic editing functions need to be provided in the copier 100, thereby reducing the cost of the copier 100. Only the users who need special image editing function additionally purchase, as an option, the control unit and the application for setting the various modes, which allow complicated mode settings to be made using a general-purpose computer in an office. Therefore, there is an additional value of the copier since it can be easily updated to a new version.

(5) Embodiment Modifications

Although the copier of the present invention has been described by way of an embodiment, the scope of the present invention is in no way limited to the present embodiment.

(5-1) Although the control unit 200 is separable from the copier 100 in the present embodiment, the control unit 200 can be integrated into the copier 100 beforehand. Even in this case, there is an advantage that a general-purpose computer is used as an external mode setting apparatus to set easily various copy modes.

(5-2) The control unit 200 in the present embodiment was described as having a data processing ability. If the copier 100, however, has all of the desired editing functions, it is not necessary for the control unit 200 to have a data processing ability. Therefore, it is enough for the control unit 200 to have just functions for translating and transmitting commands from the external computer 300, and functions for translating and transmitting responses from the controller 400 to the external computer 300.

(5-3) In the present embodiment, the controller 400 or the control unit 200 is asked to provide information about their data processing ability when a copy operation or a print operation is designated. However, if a special mode setting application for each combination of a copier and a control unit is prepared and information about processing ability of each combination is included in the software beforehand, it is not necessary to inquire the data processing ability.

(5-4) Although the present embodiment describes the case where a monochrome digital copier is used, the present invention can be applied to any image processing system which can form images based on edited image data, using image forming apparatus such as a full-color digital copier.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. An image processing system comprising:
   an image reader for reading a document image;
   an image forming apparatus, adapted to operate in a plurality of image processing modes to form an image representative of a document image read by said image reader, having:
      a control unit for controlling an image forming operation according to an image processing mode which is selected from the plurality of image processing modes;
      a first selecting unit for selecting an image processing mode from a first group of image processing modes, the first group of image processing modes being included within the plurality of image processing modes; and
      an image forming mechanism for forming an image representative of the image data processed by the control unit; and
   an external computer, connected to the image forming apparatus, having a second selecting unit for selecting an image processing mode from a second group of image processing modes, the second group of image processing modes being included within the plurality of image processing modes,
   wherein, for a single image processing operation, a user can select an image processing mode from (i) said first group of image processing modes using said first selecting unit and (ii) at least said second group of image processing modes using said external computer to form said image representative of a document image read by said image reader.

2. An image processing system in accordance with claim 1, wherein the first selecting unit includes an operation panel to receive an operation mode selection.

3. An image processing system comprising:
   an image forming apparatus having a first control unit for controlling an image forming operation according to an image forming operation mode which is selected from a first group of image forming operation modes;
   an external image editing apparatus having a second control unit for controlling an image forming operation of the image forming apparatus according to an image forming operation mode which is selected from a second group of image forming operation modes which can be applied to a document image read by an image reader; and
   an external computer having,
   a recognizing unit for recognizing image forming operation modes included in the first group and image forming operation modes included in the second group;
   a selecting unit for selecting an image forming operation mode from the image forming operation modes in the first group and the second group recognized by the recognizing unit; and a determination unit for determining which of the first control unit and the second control unit is to perform the operation mode selected by the operation mode selecting unit based on operation of the recognizing unit.

4. An image processing apparatus capable of operating in a plurality of image processing modes, the apparatus comprising:

an image reader for reading a document image;

a mode inputting unit to input an image processing mode from a group of predetermined image processing modes, the predetermined image processing modes being included within the plurality of image processing modes;

a connector to connect the image processing apparatus with an external apparatus and to receive an image processing mode from a connected external apparatus, wherein an image processing mode received from a connected external device is selectable from a group consisting of the predetermined image processing modes and at least one image processing mode not included within the group of predetermined image processing modes;

an image processing unit to process image data read by the image reader according to (i) image processing modes inputted from the mode inputting unit and an external apparatus connected to the image processing apparatus and (ii) image processing modes inputted from the mode inputting unit when no external apparatus is connected to the image processing apparatus; and an image output unit to output an image according to the image data processed by the image processing unit;

wherein the image processing unit is adapted to process image data in accordance with image processing modes input from both the mode inputting unit and the external apparatus for a single image forming operation.

5. An image processing system in accordance with claim 4, wherein the recognizing unit is adapted to request information from the image forming apparatus and the external image editing apparatus and to receive responses to such requests therefrom, and wherein a received response enables the recognizing unit to recognize image forming operation modes of the first group and image forming operation modes of the second group.

6. An image processing apparatus in accordance with claim 4, wherein the external apparatus is an external computer.

7. An image processing apparatus in accordance with claim 4, wherein the mode inputting unit includes an operation panel.

8. An image processing apparatus in accordance with claim 7, wherein the operation panel is set on the image processing apparatus.

9. An image processing apparatus comprising:

an image reader to read a document image;

an image processing unit to process image data representative of a document image read by the image reader according to at least one set image processing mode;

an image outputting unit to output an image according to the image data processed by the image processing unit;

a mode inputting unit to input an image processing mode from a group of predetermined image processing modes; and a mode setting unit to set at least one image processing mode to process image data representative of a document image read by the image reader according to at least one image processing mode inputted by the mode inputting unit, wherein, in a single image forming operation, the mode setting unit is adapted to also set at least one image processing mode, which is not one of the predetermined image processing modes, according to a designation received from an external apparatus.

10. An image processing apparatus in accordance with claim 9, wherein the operation panel is set on the image processing apparatus.

11. An image processing apparatus in accordance with claim 9, wherein the mode inputting unit includes an operation panel.

12. An image processing apparatus in accordance with claim 11, wherein the operation panel is set on the image processing apparatus.

13. An image processing system to process image information generated by an image reader, the system comprising an image forming apparatus, having a first control unit to control an image forming operation according to an operation mode selected from a first group of image forming operation modes and an external image editing apparatus, having a second control unit for controlling an image forming operation of the image forming apparatus according to an operation mode selected from a second group of image forming operation modes, the image forming apparatus and the image editing apparatus being connected to each other, wherein said first group of image forming operation modes and said second group of image forming operation modes can be used in an image forming operation for image information generated by the image reader, the system further comprising:

a setting unit to set either of the first control unit and the second control unit to perform a control corresponding to the operation mode inputted by an operator.

14. An image processing system in accordance with claim 13, wherein the setting unit is an external computer.

15. A digital copier adapted to operate in a plurality of image forming modes and to receive a signal from an external computer, the digital copier comprising:

an image reader;

a printer to print images based on image data read by the image reader;

an operation panel to select an image forming mode from a group of predetermined image forming modes; and a controller to process image data read by the image reader and to transmit processed image data to the printer according to at least one image forming mode selected through the operation panel, wherein the controller is adapted to also process image data read by the image reader according to at least one image forming mode which is not included within the group of predetermined image forming modes, and the at least one image forming mode which is not included within the group of predetermined image forming modes is designated by a signal from an external computer, wherein the controller is adapted to process image data in accordance with image forming modes input from both the operation panel and the external computer for a single image forming operation.

16. An image processing system comprising a digital copier and an external image editing apparatus which are connected to each other, the digital copier including a first control unit to control an image forming operation for image information generated by an image reader of the digital copier according to an operation mode selected from a first group of image forming operation modes, and the external image editing apparatus including a second control unit to control an image forming operation for image information generated by the image reader according to an operation mode selected from a second group of image forming operation modes, the system further comprising:

a setting unit for setting either of the first control unit and the second control unit to perform a control corresponding to the operation mode inputted by an operator.

17. An image processing system in accordance with claim 16, wherein the setting unit is an external computer.

18. An image processing system in accordance with claim 1, wherein an image forming operation selected through the first selecting unit of the image forming apparatus requires complex instructions selectable through the second selecting unit.

19. An image processing system in accordance with claim 3, wherein the recognizing unit is adapted to request information from the image forming apparatus and the external image editing apparatus and to receive responses to such requests therefrom, and wherein a received response enables the recognizing unit to recognize image forming operation modes of the first group and image forming operation modes of the second group.

\* \* \* \* \*

UNITED STATES PATENT AND TRADEMARK OFFICE
CERTIFICATE OF CORRECTION

PATENT NO. : 6,278,526 B1
DATED : August 21, 2001
INVENTOR(S) : Yoshiharu Kurozasa It is certified that error appears in the above-identified patent and that said Letters Patent is hereby corrected as shown below:

Column 19,
Lines 39-47, delete: "5. An image processing system in accordance with claim 4, wherein the recognizing unit is adapted to request information from the image forming apparatus and the external image editing apparatus and to receive responses to such requests therefrom, and wherein a received response enables to recognizing unit to recognize image forming operation modes of the first group and image forming operation modes of the second group."
Line 48, delete "6.", and insert -- 5. --.
Line 51, delete "7.", and insert -- 6. --.
Line 54, delete "8.", and insert -- 7. --.
Line 55, delete "claim 7,", and insert -- claim 6, --.
Line 57, delete "9.", and insert -- 8. --.

Column 20,
Lines 11-13, delete "10. An image processing apparatus in accordance with claim 9, wherein the operation panel is set on the image processing apparatus.".
Line 14, delete "11.", and insert -- 9. --.
Line 15, delete "claim 9,", and insert claim 8, --.
Line 17, delete "12.", and insert -- 10 --.
Line 18, delete "claim 11,", and insert -- claim 9, --.
Line 20, delete "13.", and insert -- 11. --.
Line 39, delete "14.", and insert -- 12. --.
Lines 39 and 40, delete "claim 13,", and insert -- claim 11, --.
Line 41, delete "15.", and insert -- 13 --.
Line 66, delete "16.", and insert -- 14. --.

Column 21,
Line 15, delete "17.", and insert -- 15. --.
Line 16, delete "claim 16,", and insert -- claim 14, --.

UNITED STATES PATENT AND TRADEMARK OFFICE
CERTIFICATE OF CORRECTION

PATENT NO.   : 6,278,526 B1
DATED        : August 21, 2001
INVENTOR(S)  : Yoshiharu Kurozasa It is certified that error appears in the above-identified patent and that said Letters Patent is hereby corrected as shown below:

Column 22,
Line 1, delete "18.", and insert -- 16. --.
Line 6, delete "19.", and insert -- 17. --

Signed and Sealed this

Twenty-third Day of April, 2002

Attest:

Attesting Officer

JAMES E. ROGAN
*Director of the United States Patent and Trademark Office*